United States Patent
Kobayashi

(10) Patent No.: US 10,198,640 B2
(45) Date of Patent: Feb. 5, 2019

(54) MEASURING DEVICE, MEASURING SYSTEM, MEASURING METHOD, AND PROGRAM

(71) Applicant: Seiko Epson Corporation, Tokyo (JP)

(72) Inventor: Yoshihiro Kobayashi, Komagane (JP)

(73) Assignee: Seiko Epson Corporation (JP)

( * ) Notice: Subject to any disclaimer, the term of this patent is extended or adjusted under 35 U.S.C. 154(b) by 105 days.

(21) Appl. No.: 15/272,735

(22) Filed: Sep. 22, 2016

(65) Prior Publication Data

US 2017/0098127 A1    Apr. 6, 2017

(30) Foreign Application Priority Data

Oct. 2, 2015  (JP) ................................ 2015-196615
Oct. 2, 2015  (JP) ................................ 2015-196617

(51) Int. Cl.

| | | |
|---|---|---|
| *G06K 9/00* | (2006.01) | |
| *G01G 19/03* | (2006.01) | |
| *G01G 23/01* | (2006.01) | |
| *G06K 9/52* | (2006.01) | |
| *G01P 15/00* | (2006.01) | |
| *G01M 5/00* | (2006.01) | |

(52) U.S. Cl.
CPC ....... *G06K 9/00791* (2013.01); *G01G 19/035* (2013.01); *G01G 23/01* (2013.01); *G01M 5/0008* (2013.01); *G01P 15/00* (2013.01); *G06K 9/00335* (2013.01); *G06K 9/52* (2013.01)

(58) Field of Classification Search
CPC .. G06K 9/00791; G06K 9/00335; G06K 9/52; G01G 19/035; G01G 23/01; G01M 5/0008; G01P 15/00
USPC ......................................................... 348/148
See application file for complete search history.

(56) References Cited

U.S. PATENT DOCUMENTS

| | | | |
|---|---|---|---|
| 6,556,927 B1 | 4/2003 | Latta | |
| 9,267,862 B1 | 2/2016 | Kavars et al. | |
| 9,772,237 B1* | 9/2017 | Bednarz | ................... G01L 1/22 |
| 2012/0173171 A1* | 7/2012 | Bajwa | ................... G01H 11/06 |
| | | | 702/56 |

FOREIGN PATENT DOCUMENTS

| | | | | |
|---|---|---|---|---|
| JP | 62-088098 A | | 4/1987 | |
| JP | 2002-523767 A | | 7/2002 | |
| JP | 2005-030786 A | | 2/2005 | |
| JP | 4996498 B2 | | 8/2012 | |
| JP | 2013-205164 A | | 10/2013 | |
| WO | WO 2014089591 A1 * | | 6/2014 | ........... G01G 19/024 |

* cited by examiner

*Primary Examiner* — William C Vaughn, Jr.
*Assistant Examiner* — Jae N Noh
(74) *Attorney, Agent, or Firm* — Harness, Dickey & Pierce, P.L.C.

(57) ABSTRACT

A measuring device includes a data acquisition unit that acquires measurement data, including width direction acceleration of a road surface on which a moving object moves, from an acceleration sensor provided on a structure having the road surface, and a moving object information acquisition unit that acquires information relating to the moving object moving on the road surface, on the basis of the width direction acceleration.

12 Claims, 14 Drawing Sheets

MEASURING DEVICE, MEASURING SYSTEM, MEASURING METHOD, AND PROGRAM

BACKGROUND

1. Technical Field

The present invention relates to a measuring device, a measuring system, a measuring method, and a program.

2. Related Art

JP-A-2005-30786 discloses that a bridge is provided with a plurality of sensors for speed detection, a plurality of sensors for wheel axle detection, a distance sensor for vehicle position detection, and a plurality of strain gauges, and the speeds, positions, number, weights and the like of vehicles traveling on the bridge are calculated using signals from these devices.

However, in JP-A-2005-30786, a large number of various types of sensors are used, which leads to an increase in the scale of a measuring system. For this reason, a large amount of labor and cost are incurred in the installation or maintenance of these sensors. In addition, in JP-A-2005-30786, since a large number of sensors are used, it is necessary to process vast amounts of data, and thus the process of a computer becomes complicated, or a processing load increases.

SUMMARY

An advantage of some aspects of the invention is to obtain information relating to a moving object such as a vehicle moving on a structure such as a bridge, using a small-scale and simple system configuration.

A measuring device according to an aspect of the invention includes: a data acquisition unit that acquires measurement data, including width direction acceleration of a road surface on which a moving object moves, from an acceleration sensor provided on a structure having the road surface; and a moving object information acquisition unit that acquires information relating to the moving object moving on the road surface, on the basis of the width direction acceleration. Thereby, it is possible to acquire the information relating to the moving object moving on the road surface, on the basis of the width direction acceleration which is output from one acceleration sensor, and to obtain the information relating to the moving object moving on the structure, using a small-scale and simple system configuration.

In the measuring device, the acceleration sensor may be provided at a central portion of an end of the structure which is parallel to a regulation direction of a movement direction regulation unit of the moving object provided on the structure. At this installation position, since the displacement of the road surface in a vertical direction or the inclination thereof in a width direction is revealed more distinctly when the moving object moves than in other installation positions, it is possible to more accurately determine the information relating to the moving object.

In the measuring device, the structure may be a bridge. With this configuration, it is possible to obtain the information relating to the moving object moving on the bridge, using a small-scale and simple system configuration.

In the measuring device, the width direction acceleration may be a gravity component to be detected due to an inclination of the road surface. With this configuration, it is possible to simply obtain the inclination of the road surface as the output (width direction acceleration) of the acceleration sensor.

In the measuring device, the moving object information acquisition unit may acquire the position of the moving object in the width direction on the road surface, on the basis of the width direction acceleration. With this configuration, it is possible to simply acquire the position of the moving object in the width direction.

The measuring device may further include a detection unit that detects a movement of the moving object on the road surface, and in a case where the movement of the moving object on the road surface is detected, the moving object information acquisition unit may acquire the position of the moving object on the basis of the width direction acceleration included in a period of time relating to the movement. With this configuration, it is possible to accurately acquire the position of the moving object, during movement on the road surface, in the width direction.

The measuring device may further include a filtering unit that removes a frequency band including a natural resonance frequency component of the structure from the width direction acceleration. With this configuration, it is possible to accurately acquire the position of the moving object in the width direction, on the basis of a frequency component generated from the structure due to the movement of the moving object.

In the measuring device, the acquisition unit may acquire the measurement data including vertical direction acceleration of the road surface from the acceleration sensor, the measuring device may further include a displacement calculation unit that calculates vertical direction displacement of the road surface on the basis of the vertical direction acceleration, and the moving object information acquisition unit may acquire the position of the moving object in the width direction on the road surface, on the basis of ratios of the vertical direction displacement and the width direction acceleration. With this configuration, it is possible to more accurately acquire the position of the moving object in the width direction than in a case where only the width direction acceleration out of the vertical direction displacement and the width direction acceleration is used.

In the measuring device, the moving object information acquisition unit may acquire a division zone in which the moving object passes in the width direction on the road surface, on the basis of a distribution of the ratios of the vertical direction displacement and the width direction acceleration. With this configuration, it is possible to acquire the passage division zone of the moving object.

The measuring device may further include a detection unit that detects a movement of the moving object on the road surface. In a case where the movement of the moving object on the road surface is detected, the displacement calculation unit may calculate the vertical direction displacement on the basis of the vertical direction acceleration included in a period of time relating to the movement, and the moving object information acquisition unit may acquire the position of the moving object on the basis of ratios of the vertical direction displacement and the width direction acceleration included in the period of time. With this configuration, it is possible to accurately acquire the position of the moving object, during movement on the road surface, in the width direction.

In the measuring device, the acquisition unit may acquire the measurement data including vertical direction acceleration of the road surface from the acceleration sensor, the measuring device may further include a displacement calculation unit that calculates vertical direction displacement of the road surface on the basis of the vertical direction acceleration, and the acquisition unit may acquire a weight of the moving object with respect to the calculated vertical direction displacement and the acquired width direction acceleration, on the basis of characteristic information indicating the weight of the moving object moving on the road surface with respect to vertical direction displacement and width direction acceleration which are stored in a storage unit. With this configuration, it is possible to simply acquire the weight of the moving object.

The measuring device may further include a detection unit that detects a movement of the moving object on the road surface. In a case where the movement of the moving object on the road surface is detected, the displacement calculation unit may calculate the vertical direction displacement on the basis of the vertical direction acceleration included in a period of time relating to the movement, and the moving object information acquisition unit may acquire the weight of the moving object with respect to the vertical direction displacement and the width direction acceleration included in the period of time. With this configuration, it is possible to accurately acquire the weight of the moving object during movement on the road surface.

The measuring device may further include: an image analysis unit that acquires a weight of a sample moving object moving on the road surface, on the basis of an image obtained by capturing an image of the sample moving object and moving object information stored in the storage unit; and a calibration unit that calibrates the characteristic information on the basis of the weight of the sample moving object, and the vertical direction displacement and the width direction acceleration when the sample moving object moves on the road surface. With this configuration, it is possible to improve the characteristic information and the determination accuracy for the weight of the moving object based thereon.

The measuring device may further include a calibration unit that calibrates the characteristic information on the basis of a weight of a sample moving object moving on the road surface which is stored in the storage unit, the vertical direction displacement and the width direction acceleration when the sample moving object moves on the road surface. With this configuration, it is possible to improve the characteristic information and the determination accuracy for the weight of the moving object based thereon, without performing an image analysis.

The measuring device may further include a filtering unit that removes a frequency band, including a natural resonance frequency component of the structure, from the vertical direction acceleration and the width direction acceleration. With this configuration, it is possible to accurately acquire the position or weight of the moving object in the width direction, on the basis of the frequency component generated from the structure due to the movement of the moving object.

The measuring device may further include an output unit that outputs the acquired information relating to the moving object. With this configuration, a user is able to simply recognize the information relating to the moving object moving on the road surface.

A measuring method according to another aspect of the invention includes: acquiring measurement data, including width direction acceleration of a road surface on which a moving object moves, from an acceleration sensor provided on a structure having the road surface; and acquiring information relating to the moving object moving on the road surface, on the basis of the width direction acceleration. With this configuration, it is possible to acquire the information relating to the moving object moving on the road surface, on the basis of the width direction acceleration which is output from one acceleration sensor, and to obtain the information relating to the moving object moving on the structure, using a simple method.

A measuring system according to still another aspect of the invention includes: an acceleration sensor, provided on a structure having a road surface on which a moving object moves, which outputs measurement data including width direction acceleration of the road surface; a data acquisition unit that acquires the measurement data from the acceleration sensor; and a moving object information acquisition unit that acquires information relating to the moving object moving on the road surface, on the basis of the width direction acceleration. With this configuration, it is possible to acquire the information relating to the moving object moving on the road surface, on the basis of the width direction acceleration which is output from one acceleration sensor, and to obtain the information relating to the moving object moving on the structure, using a small-scale and simple system configuration.

A program according to yet another aspect of the invention causes a computer to execute: a procedure of acquiring measurement data, including width direction acceleration of a road surface on which a moving object moves, from an acceleration sensor provided on a structure having the road surface; and a procedure of acquiring information relating to the moving object moving on the road surface, on the basis of the width direction acceleration. With this configuration, it is possible to acquire the information relating to the moving object moving on the road surface, on the basis of the width direction acceleration which is output from one acceleration sensor, and to obtain the information relating to the moving object moving on the structure, using a simple procedure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings. In each of the embodiments, a description will be given by taking an example of a vehicle as a moving object and a bridge as a structure object or a structure.

First Embodiment

Figure 1:
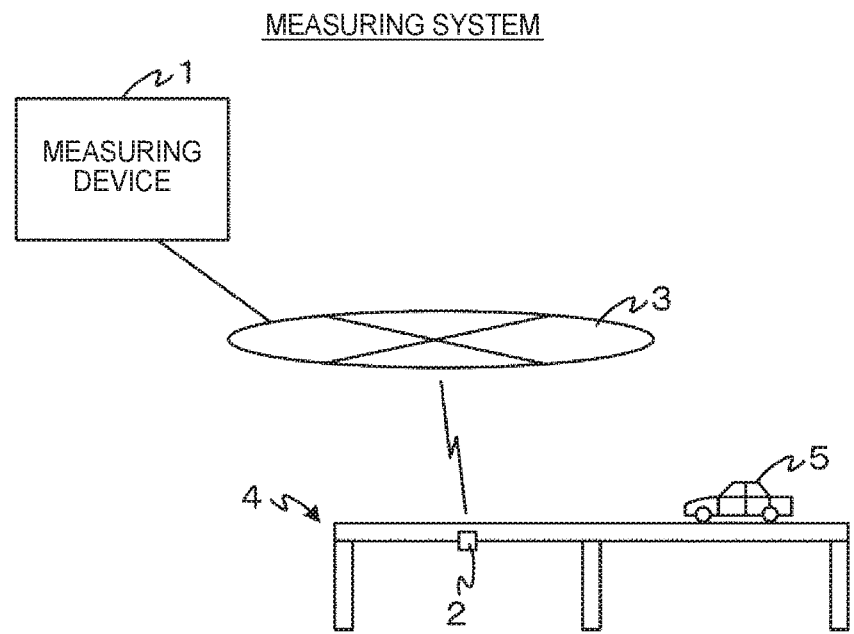
FIG. 1 is a diagram illustrating an example of a schematic configuration of a measuring system according to a first embodiment of the invention.

FIG. 1 is a diagram illustrating an example of a schematic configuration of a measuring system according to a first embodiment of the invention.

The measuring system includes a measuring device 1 and an acceleration sensor 2. The measuring device 1 and the acceleration sensor 2 are communicably connected to each other through a communication network 3. The acceleration sensor 2, installed on a bridge 4, measures acceleration generated in the bridge 4 by the passage of a vehicle 5 or the like, and transmits measurement data to the measuring device 1. The measuring device 1 receives the measurement data from the acceleration sensor 2, and acquires information (position, weight or the like) relating to the vehicle 5, using acceleration included in the measurement data.

Meanwhile, the acceleration sensor 2 has, for example, a wireless communication interface, or is connected to a wireless communication interface, and is connected to the communication network 3 through the wireless communication interface. In addition, the acceleration sensor 2 may preferably be a sensor capable of outputting measurement data of at least acceleration. That is, the acceleration sensor also includes an inertial sensor that outputs other measurement data such as angular velocity in addition to the acceleration.

Figure 2A:
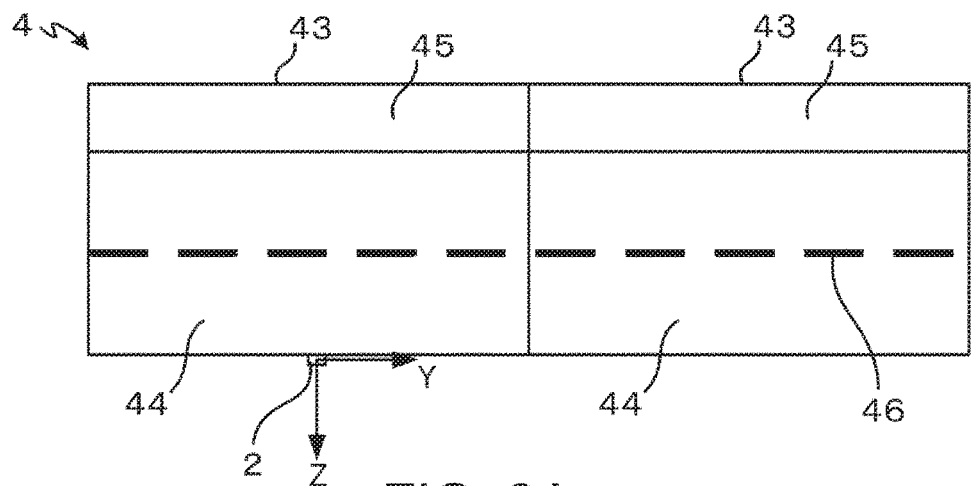
FIGS. 2A to 2C are diagrams illustrating an example of a method of installing an acceleration sensor.
Figure 2B:
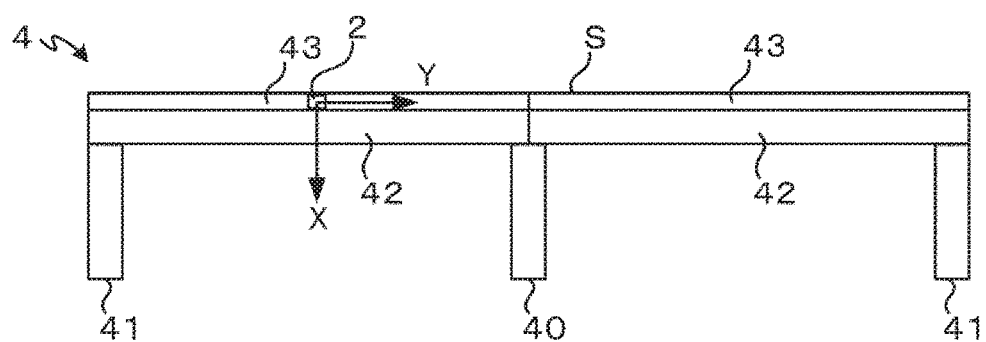
Figure 2C:
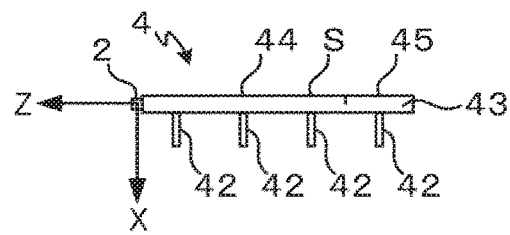

FIGS. 2A to 2C are diagrams illustrating an example of a method of installing an acceleration sensor. FIG. 2A is a plan view of the bridge 4, FIG. 2B is a side view of the bridge 4, and FIG. 2C is an end view of the bridge 4 around the acceleration sensor 2 in a width direction.

The bridge 4 includes a bridge pier 40 located at the central portion (including the approximately central portion) of the bridge 4, two bridge abutments 41 located on both ends of the bridge 4, and two sets of main girders 42 and floor slabs 43 that span upper portions from one bridge abutment 41 to the bridge pier 40 and from the bridge pier 40 to the other bridge abutment 41. The bridge pier 40 and the two bridge abutments 41 are fixed onto the foundation (not shown) installed on the ground. The main girder 42 includes a plurality of rows of girders (four rows in FIGS. 2A to 2C), and is fixed to the bridge pier 40 and the bridge abutment 41 on the bridge pier 40 and the bridge abutment 41. The floor slab 43 is coupled to each of the plurality of girders on the main girder 42, and is fixed to the main girder 42. A roadway 44 of two lanes (equivalent to a movement direction regulation unit according to the invention) and a footway 45 are provided on the floor slab 43. In addition, the roadway 44 has a central line 46 drawn thereon.

Hereinafter, in order to make the description thereof easier to understand, a road surface S of the bridge 4 is assumed to be horizontal, and the vertical direction of the road surface S is assumed to be coincident with a plumb direction.

The acceleration sensor 2 can measure acceleration generated in each axial direction of three axes which are orthogonal to each other. The acceleration sensor 2 is installed on the bridge 4 so that, for example, one axis (for example, X-axis) out of three detection axes (X-axis, Y-axis, and Z-axis) is coincident with a vertical direction with respect to the road surface S, and that another axis (for example, Z-axis) is coincident with the width direction of the road surface S. That is, the acceleration sensor 2 measures the vertical direction acceleration (for example, X-axis) of the bridge 4, the traveling direction (regulation direction) acceleration (for example, Y-axis) of the vehicle 5 of the bridge 4, and the width direction acceleration (for example, Z-axis) of the bridge 4. The detection of the traveling direction acceleration and the width direction acceleration is the detection of a gravity component due to the inclination of the road surface S. Meanwhile, in the present embodiment, the traveling direction acceleration and the width direction acceleration may be called horizontal direction acceleration, and the vertical direction acceleration may be called plumb direction acceleration. The acceleration sensor 2 detects triaxial acceleration, for example, at a set sampling frequency, and transmits data of the detected acceleration to the measuring device 1 through the communication network 3.

In addition, the acceleration sensor 2 is provided at the central portion (including the approximately central portion) of a side (equivalent to the end according to the invention) which is approximately parallel to the regulation direction of the movement direction regulation unit provided on a structure which is approximately quadrilateral when seen in a plan view. Which the structure is a bridge, it is preferable that the acceleration sensor 2 is provided on the floor slab of the bridge. The floor slab as used herein refers to a portion constituting a surface on which a moving object moves.

Figure 3:
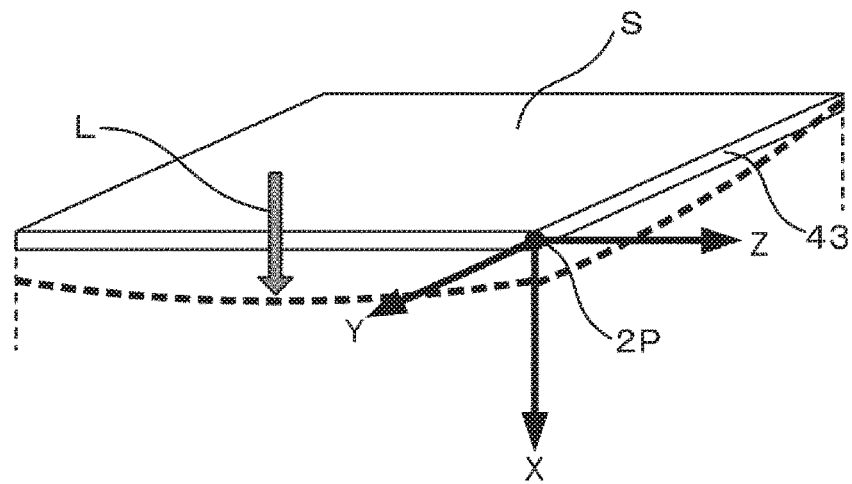
FIG. 3 is a diagram illustrating an example of a way to deform a floor slab.

More specifically, the acceleration sensor 2 is installed at the central portion (including the approximately central portion) of the lateral side (equivalent to the end according to the invention) of one floor slab 43 (left floor slab 43 of FIG. 2B) in a regulation direction. The lateral side of the floor slab 43 is parallel (including approximately parallel) to the regulation direction. As shown in FIG. 3 (diagram illustrating an example of a way to deform the floor slab), in a case where the vehicle 5 passes on the road surface S of the floor slab 43, the floor slab 43 is deformed so as to bend downward due to the load L of the vehicle 5 (thick broken line in FIG. 3). Here, since an installation position 2P of the aforementioned acceleration sensor 2 is a position farthest from the bridge pier 40 and the bridge abutment 41, a change in the position (position on the X-axis) of the floor slab 43 in a vertical direction has a tendency to be revealed more distinctly than in other positions thereof. In addition, since the installation position 2P is the lateral side of the floor slab 43, the inclination (inclination of the Z-axis) of the floor slab 43 in a width direction has a tendency to be revealed more distinctly than in other positions thereof. As described later, in the present embodiment, the vertical direction acceleration and the width direction acceleration of the floor slab 43 among the measurement data from the acceleration sensor 2 are basically used.

Meanwhile, the components of the bridge 4 shown in FIGS. 1 to 3 are those relating to main components in the description of the present embodiment, and are not limited to the aforementioned components. In addition, components included in general bridges of the same sort are not excluded.

Figure 4:
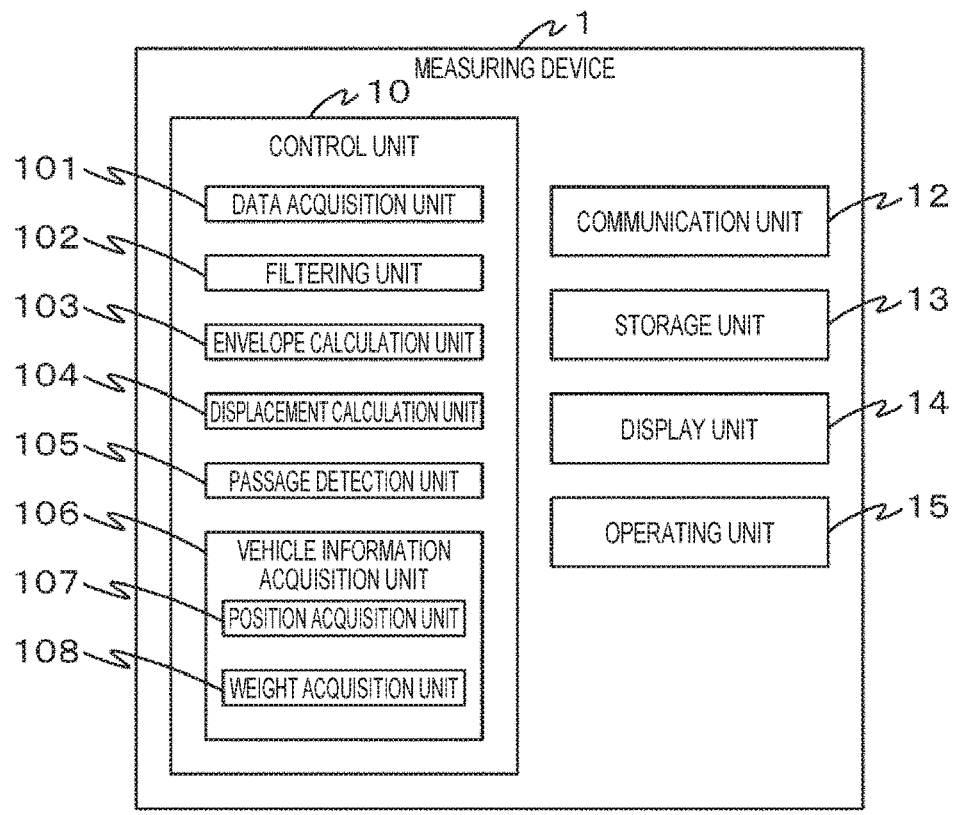
FIG. 4 is a block diagram illustrating an example of a functional configuration of a measuring device.

FIG. 4 is a block diagram illustrating an example of a functional configuration of the measuring device.

The measuring device 1 includes a control unit 10, a communication unit 12 (equivalent to an output unit of the invention), a storage unit 13, a display unit 14 (equivalent according to an output unit of the invention), and an operating unit 15.

The control unit 10 comprehensively controls the measuring device 1. The control unit 10 includes a data acquisition unit 101 (equivalent to a data acquisition unit according to the invention), a filtering unit 102, an envelope calculation unit 103, a displacement calculation unit 104, a passage detection unit 105 (equivalent to a detection unit according to the invention), and a vehicle information acquisition unit 106 (equivalent to a moving object information acquisition unit according to the invention).

The data acquisition unit 101 acquires measurement data transmitted from the acceleration sensor 2 through the communication unit 12. The triaxial acceleration is included in the measurement data. Meanwhile, in the present embodiment, at least the vertical direction acceleration and the width direction acceleration may be preferably included therein.

The filtering unit 102 separates the measurement data into low-frequency range data including a frequency component generated due to the deformation of the bridge 4 and high-frequency range data including a frequency component generated due to the natural vibration and resonant vibration of the bridge 4, and outputs the resultants. The process of the filtering unit 102 will be described later in detail.

The envelope calculation unit 103 calculates data indicating the envelope of a waveform of the vertical direction acceleration on the basis of the high-frequency range data of the vertical direction acceleration. The process of the envelope calculation unit 103 will be described later in detail.

The displacement calculation unit 104 calculates the vertical direction displacement by integrating the vertical direction acceleration twice, on the basis of the low-frequency range data of the vertical direction acceleration. The process of the displacement calculation unit 104 will be described later in detail.

The passage detection unit 105 detects the passage of the vehicle 5 in the bridge 4 on the basis of the envelope of the calculated vertical direction acceleration. The process of the passage detection unit 105 will be described later in detail.

The vehicle information acquisition unit 106 acquires information relating to a vehicle passing through the bridge 4. The vehicle information acquisition unit 106 includes a position acquisition unit 107 and a weight acquisition unit 108.

The position acquisition unit 107 acquires the position of the vehicle 5 passing through the bridge 4 in the width direction of the road surface S, on the basis of the calculated vertical direction displacement and the low-frequency range data of the width direction acceleration. The process of the position acquisition unit 107 will be described later in detail.

The weight acquisition unit 108 acquires the weight of the vehicle 5 passing through the bridge 4, on the basis of the calculated vertical direction displacement and the low-frequency range data of the width direction acceleration. The process of the weight acquisition unit 108 will be described later in detail.

The communication unit 12 is connected to the communication network 3, and transmits and receives information. The storage unit 13 stores data used in a process by the control unit 10, the acquired measurement data, and the like. The display unit 14 displays a screen or the like. The operating unit 15 receives a user's operation input, and outputs an operation signal based on the operation to the control unit 10.

Meanwhile, the measuring device 1 can be realized by, for example, a computer. The computer includes, for example, an arithmetic operation device such as a central processing unit (CPU), a main storage device such as a random access memory (RAM), an auxiliary storage device such as a flash read only memory (ROM) or a hard disk drive (HDD), a communication interface (I/F) connected to a communication line, an input device such as a keyboard or a mouse, a display device such as a liquid crystal display, a reader/writer that reads and writes information from and to a carriageable recording medium such as a digital versatile disk (DVD), and an external I/F connected to an external device through a universal serial bus (USB) or the like.

In a case where the above computer functions as the measuring device 1, the control unit 10 is realized by, for example, the arithmetic operation device and at least one of the main storage device and the auxiliary storage device. That is, the process or function of the control unit 10 can be realized, for example, by the arithmetic operation device loading a predetermined program stored in the auxiliary storage device into the main storage device to execute the loaded program. The storage unit 13 can be realized by, for example, the main storage device or the auxiliary storage device. Some or the entirety of the storage unit 13 may be realized by, for example, a storage or the like on a communication network which is connected through the communication I/F. The communication unit 12 is realized by, for example, the external I/F. The above predetermined program can be circulated by for example, storage thereof in a state capable being downloaded in a computer on a communication network or storage thereof in the carriageable recording medium such as a DVD, and be installed in the measuring device 1.

Figure 5:
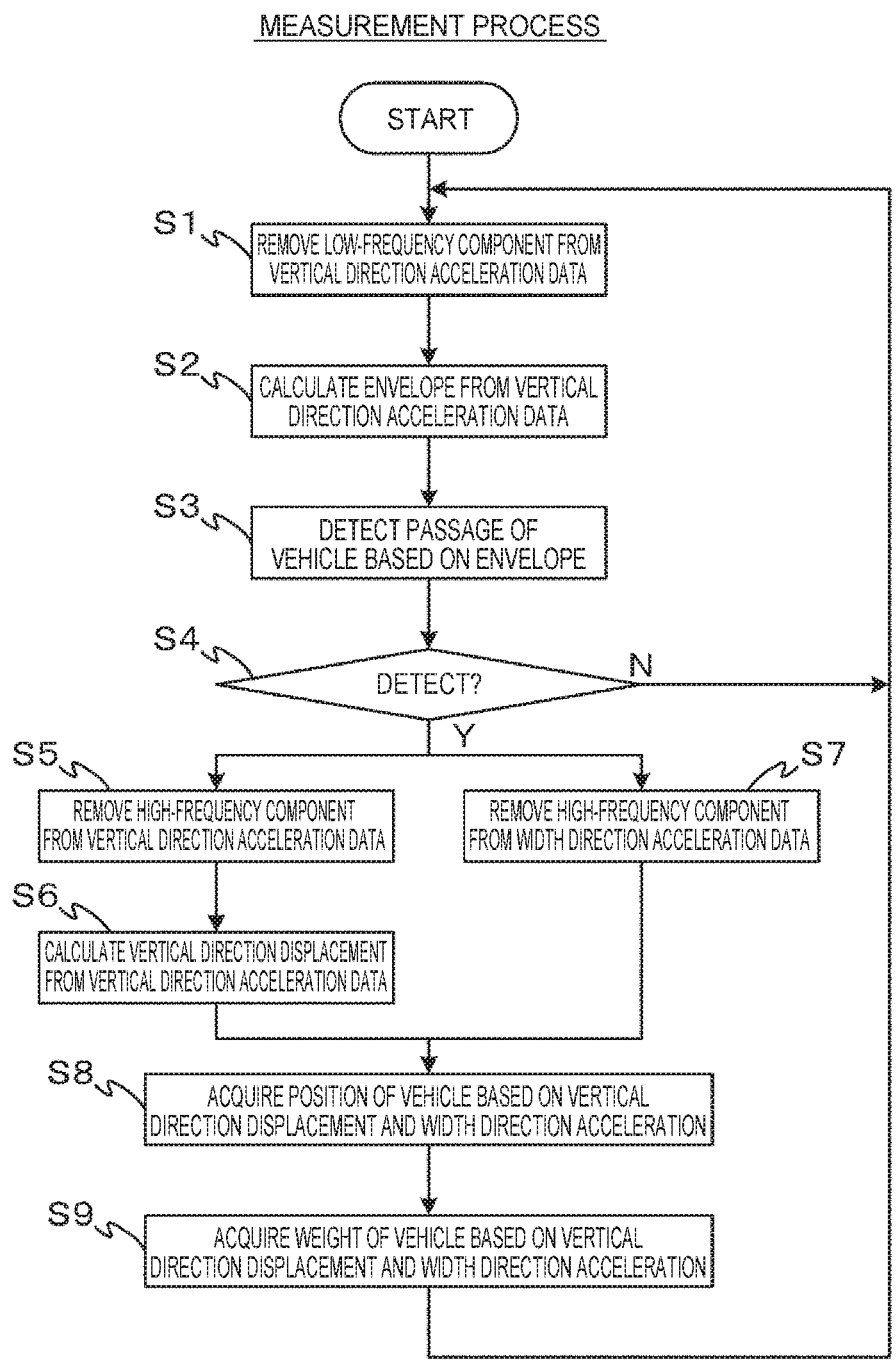
FIG. 5 is a flow diagram illustrating an example of a measurement process which is executed by the measuring device.

FIG. 5 is a flow diagram illustrating an example of a measurement process which is executed by the measuring device. Meanwhile, the data acquisition unit 101 receives, for example, measurement data (vertical direction acceleration data, and width direction acceleration data) from the acceleration sensor 2, and accumulates the measurement data in the storage unit 13 so as to be capable of analyzing the data in a time-series manner.

First, the filtering unit 102 removes a low-frequency component from the vertical direction acceleration data (step S1). For example, the filtering unit 102 performs a fast Fourier transform (FFT) process or the like on the vertical direction acceleration data in a target period of time, and obtains a power spectral density function. In addition, the filtering unit 102 separates the vertical direction acceleration data into low-frequency range data and high-frequency range data on the basis of a power distribution of the obtained frequency and a predetermined frequency threshold, and removes the low-frequency range data.

Figure 6:
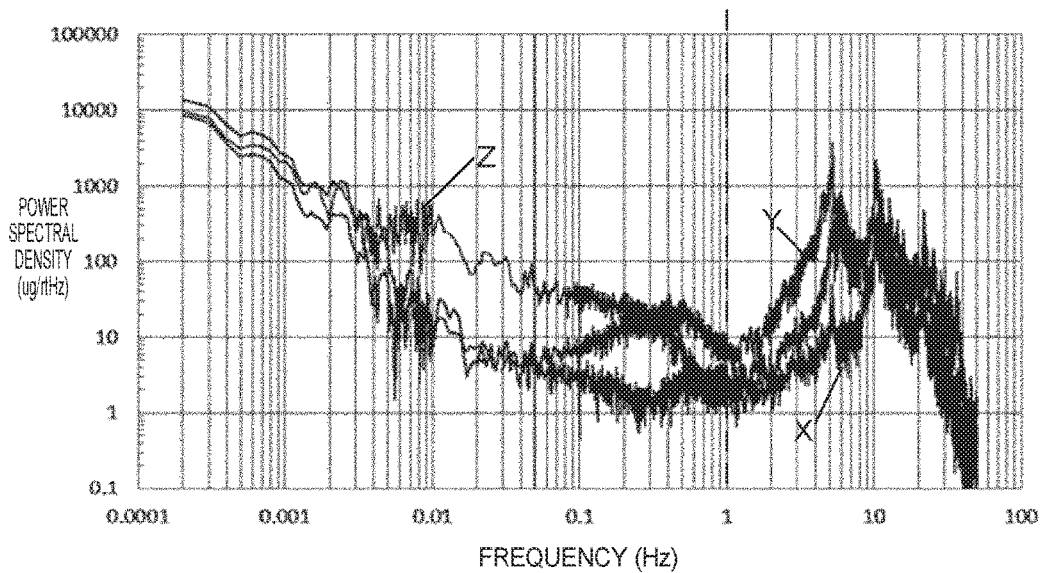
FIG. 6 is a diagram illustrating an example of a frequency power distribution of triaxial acceleration data.

FIG. 6 is a diagram illustrating an example of a frequency power distribution of triaxial acceleration data. FIG. 6 shows a frequency power distribution after the FFT process is performed on triaxial acceleration data in a predetermined period. The horizontal axis represents a frequency, and the vertical axis represents a power spectral density. Meanwhile, FIG. 6 shows a case where the length of the floor slab 43 obtained by measuring the triaxial acceleration is "30 m".

The acceleration in each axial direction has peaks around "5 Hz to 30 Hz". Some of these peaks around "10 Hz" are considered to be based on the natural resonance of the floor slab 43.

On the assumption that the speed of the vehicle 5 capable of passing through the floor slab 43 is "3 m/s to 17 m/s", the acceleration of "0.1 Hz to 1 Hz" in each axial direction is set to acceleration due to the deformation of the floor slab 43 which is caused by the passage of the vehicle 5 of the speed. This is because, for example, when the speed of the vehicle 5 passing through the floor slab 43 is set to "3 m/s to 17 m/s", it is considered that the period of vibration (time for which the floor slab bends downward and returns to the original position) due to the deformation of the floor slab 43 which is caused by the passage of the vehicle 5 is set to substantially "10 s to 1.8 s" (0.1 Hz to 0.6 Hz) of the passage time of the vehicle 5.

Frequency components lower than "0.01 Hz" are considered to be attributed to a long-period fluctuation in the floor slab 43 due to the environment such as temperature or wind, or a drift in the measuring device.

In this manner, the frequency characteristics of acceleration of the floor slab 43 are generally divided into a high-frequency portion including the natural resonance frequency of the floor slab 43 and a low-frequency portion including the frequency portion of acceleration which is caused by the passage of the vehicle 5. For example, in the frequency characteristics of acceleration shown in FIG. 6, the natural resonance frequency of the floor slab 43 is included in frequencies higher than at least "1 Hz", and the frequency component of acceleration due to the deformation of the floor slab 43 caused by the passage of the vehicle 5 is included in frequencies of "1 Hz" or lower.

Consequently, in the present embodiment, the high-frequency range data is mainly used in a case where the natural vibration and resonant vibration of the bridge 4 are evaluated, and the low-frequency range data is mainly used in a case where the deformation of the bridge 4 caused by the passage of the vehicle is evaluated.

Meanwhile, the natural resonance frequency of the floor slab 43 differs depending on the structure, material or the like of the bridge 43. In addition, the frequency component of acceleration due to the deformation of the floor slab 43 which is caused by the passage of the vehicle 5 differs depending on the length of the floor slab 43 and the assumed speed of the vehicle 5 passing through the floor slab 43.

Next, the envelope calculation unit 103 calculates the envelope of the waveform of the vertical direction acceleration from the vertical direction acceleration (high-frequency range data) separated in step S1 (step S2). For example, the envelope calculation unit 103 calculates the absolute value of the vertical direction acceleration (high-frequency range data) at each point in time in a target period of time. In addition, the envelope calculation unit 103 performs smoothing on the calculated absolute value through a low-pass filter or the like, and calculates data indicating an envelope.

Figure 7:
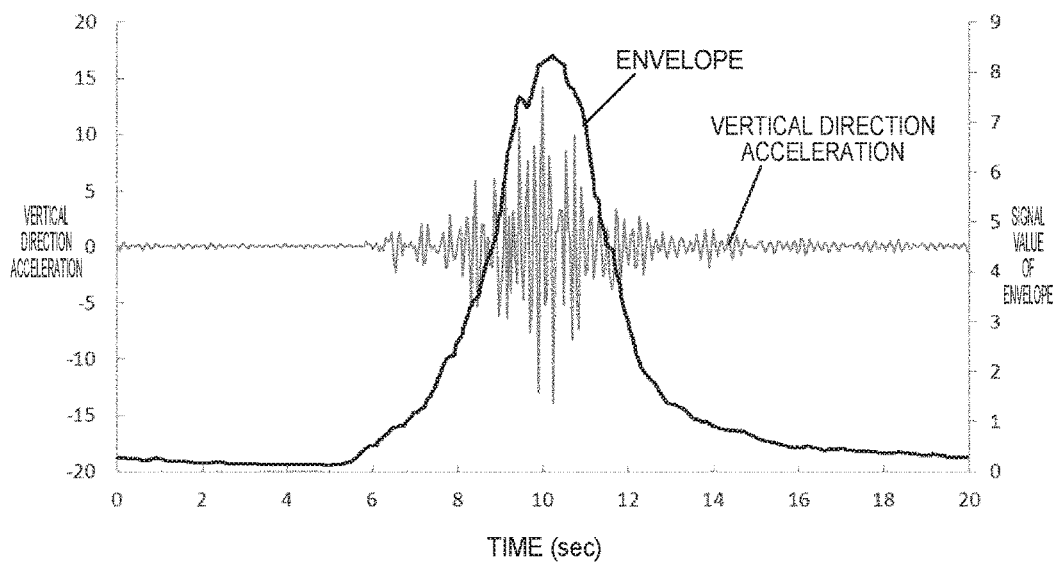
FIG. 7 is a diagram illustrating an example of an envelope waveform of vertical direction acceleration.

FIG. 7 is a diagram illustrating an example of an envelope waveform of the vertical direction acceleration. FIG. 7 shows vertical direction acceleration and the envelope thereof in a predetermined period in which the vehicle 5 has passed in front of the acceleration sensor 2. The horizontal axis represents a time, the left vertical axis represents the value of the vertical direction acceleration, and the right vertical axis represents the value of the envelope.

In this manner, in a case where the vehicle 5 has passed, peaks exceeding a predetermined threshold are shown in the envelope. Consequently, in the present embodiment, in a case where the passage of the vehicle is evaluated, the envelope of the vertical direction acceleration (high-frequency range data) is used.

Next, the passage detection unit 105 detects whether the vehicle has passed through the bridge 4 on the basis of the envelope of the vertical direction acceleration (high-frequency range data) calculated in step S2 (step S3). For example, the passage detection unit 105 determines whether the signal value of the envelope in a target period of time has exceeded a predetermined threshold. In a case where the signal value of the envelope exceeds the predetermined threshold, the passage detection unit 105 determines that the vehicle passes through the bridge 4, that is, detects the passage of the vehicle 5 through the bridge 4.

In a case where the passage of the vehicle 5 is not detected (N in step S4), the filtering unit 102 executes the process of step S1 again.

In a case where the passage of the vehicle 5 is detected (Y in step S4), the filtering unit 102 removes the high-frequency component from the vertical direction acceleration data (step S5). For example, the filtering unit 102 performs a fast Fourier transform (FFT) process or the like on the vertical direction acceleration data in a target period of time, and obtains a power spectral density function. In addition, the filtering unit 102 separates the vertical direction acceleration data into low-frequency range data and high-frequency range data on the basis of a power distribution of the obtained frequency and a predetermined frequency threshold, and removes the high-frequency range data.

From this, the displacement calculation unit 104 calculates vertical direction displacement from the vertical direction acceleration (low-frequency range data) separated in step S5 (step S6). For example, the displacement calculation unit 104 calculates data indicating the vertical direction displacement in a target period of time by integrating the vertical direction acceleration (low-frequency range data) in a target period of time twice.

Figure 8A:
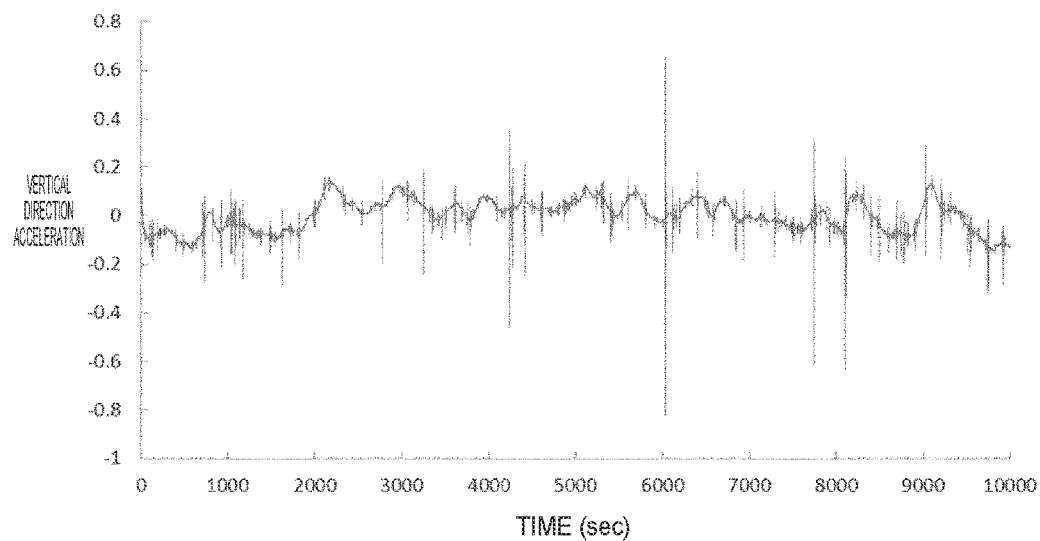
FIGS. 8A and 8B are diagrams illustrating an example of waveforms of the vertical direction acceleration and vertical direction displacement.
Figure 8B:
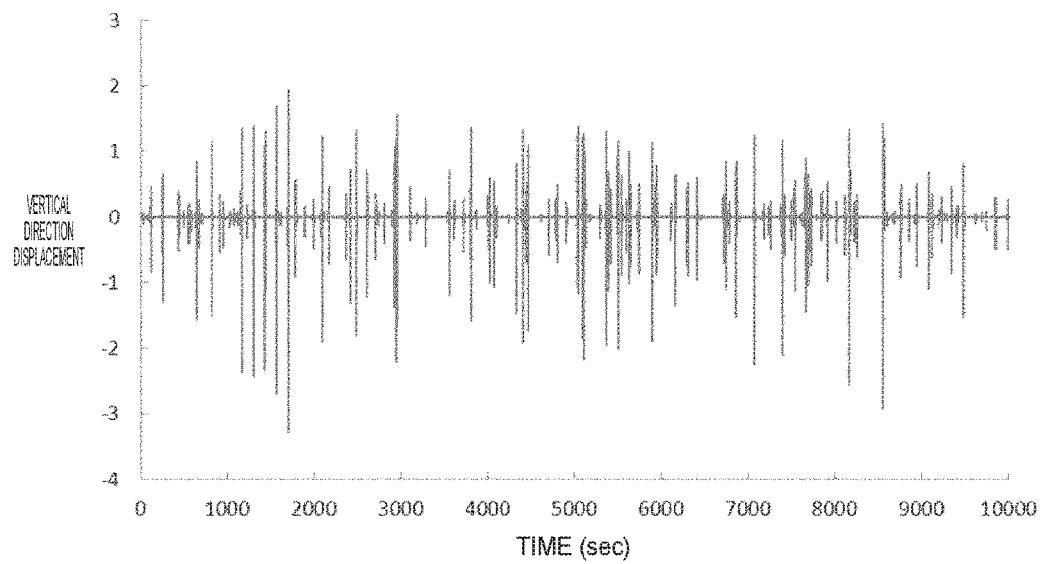

FIGS. 8A and 8B are diagrams illustrating an example of waveforms of the vertical direction acceleration and the vertical direction displacement. FIG. 8A shows the vertical direction acceleration in a predetermined period in which a plurality of vehicles 5 have passed in front of the acceleration sensor 2. The horizontal axis represents a time, and the vertical axis represents the value of the vertical direction acceleration. FIG. 8B shows the vertical direction displacement in the predetermined period. The horizontal axis represents a time, and the vertical axis represents the value of the vertical direction displacement. In this manner, in a case where the vehicle 5 has passed, changes in positive and negative directions are shown in the vertical direction acceleration and the vertical direction displacement.

In addition, in a case where the passage of the vehicle 5 is detected (Y in step S4), the filtering unit 102 removes the high-frequency component from the width direction acceleration data (step S7). For example, the filtering unit 102 performs the fast Fourier transform (FFT) process or the like on the width direction acceleration data in a target period of time, and obtains a power spectral density function. In addition, the filtering unit 102 separates the width direction acceleration data into low-frequency range data and high-frequency range data on the basis of a power distribution of the obtained frequency and a predetermined frequency threshold, and removes the high-frequency range data.

Figure 9:
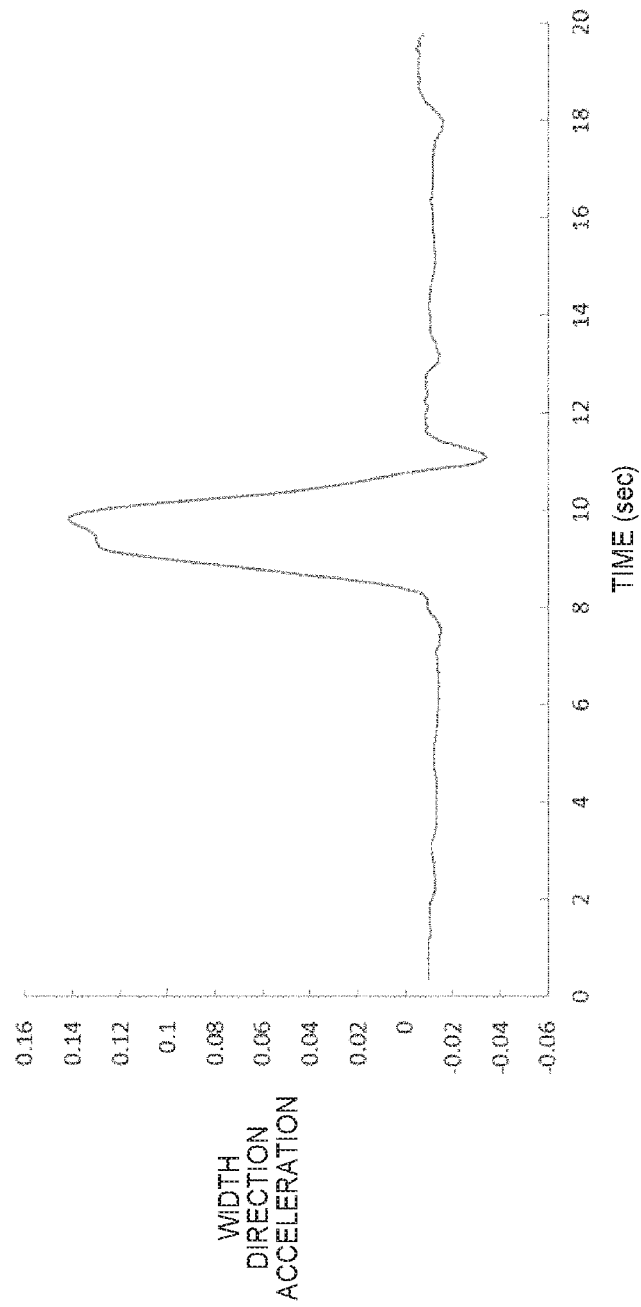
FIG. 9 is a diagram illustrating an example of a waveform of width direction acceleration.

FIG. 9 is a diagram illustrating an example of a waveform of the width direction acceleration. FIG. 9 shows the width direction acceleration in a predetermined period in which the vehicle 5 has passed in front of the acceleration sensor 2. The horizontal axis represents a time, and the vertical axis represents the value of the width direction acceleration. In this manner, in a case where the vehicle 5 has passed, peaks exceeding a predetermined threshold are shown in the width direction acceleration. Meanwhile, a change in this width direction acceleration indicates a change in the inclination (inclination of the Z-axis) of the floor slab 43 in a width direction.

Next, the position acquisition unit 107 acquires the position of the vehicle 5 passing through the bridge 4, on the basis of the vertical direction displacement calculated in step S6 and the width direction acceleration (low-frequency range data) calculated in step S7 (step S8). In step S8, the position acquisition unit 107 determines, for example, a period of time in which the signal value of the envelope exceeds a predetermined threshold in step S3, as a time of passage of the vehicle 5, and analyzes vertical direction displacement and width direction acceleration in a period of time equivalent to the time of passage.

Specifically, the position acquisition unit 107 calculates a height (peak value) from the waveform of the vertical direction displacement at the time of passage. In addition, the position acquisition unit 107 calculates a height (peak value) from the waveform of the width direction acceleration at the time of passage.

Figure 10:
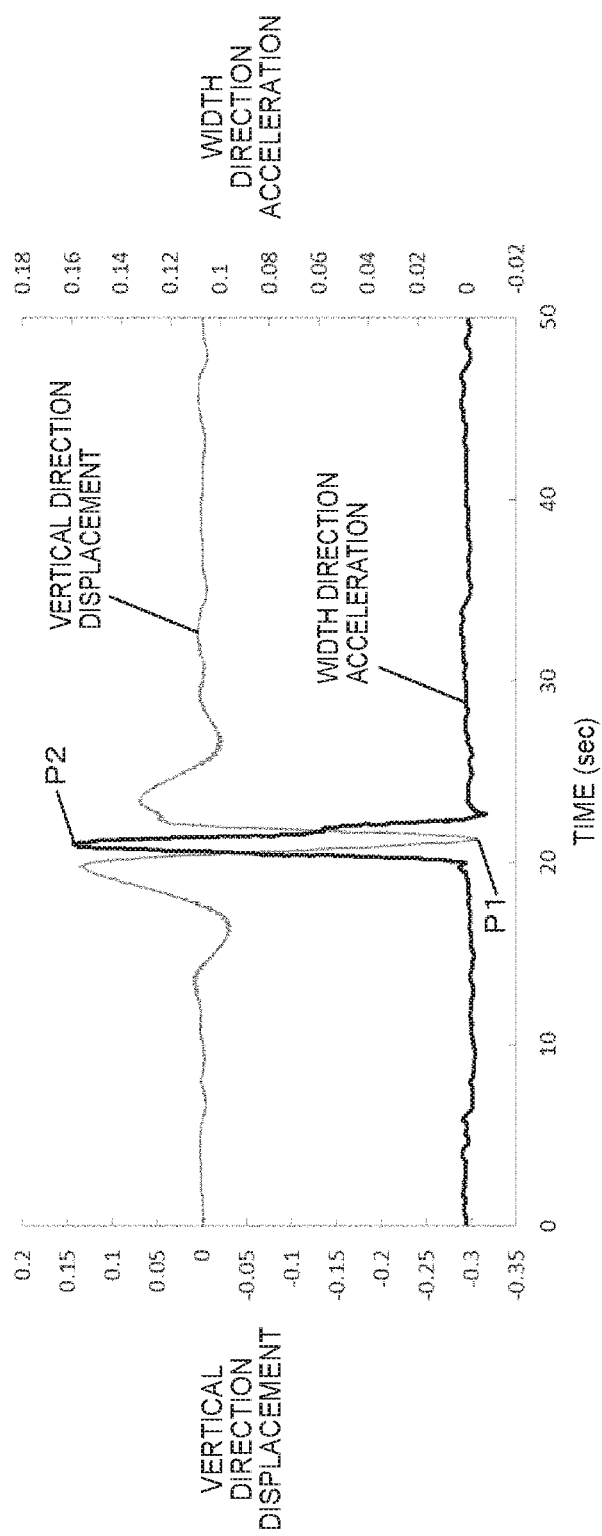
FIG. 10 is a diagram illustrating an example of waveforms of the vertical direction displacement and the width direction acceleration.

FIG. 10 is a diagram illustrating an example of waveforms of the vertical direction displacement and the width direction acceleration. FIG. 10 shows waveforms at a time of passage when one vehicle 5 has passed. The horizontal axis represents a time, the left vertical axis represents the value of the vertical direction displacement, and the right vertical axis represents the value of the width direction acceleration. Meanwhile, the vertical direction displacement and the width direction acceleration have bias adjustment performed thereon so that the reference value thereof is set to 0. The position acquisition unit 107 performs, for example, a waveform analysis of the vertical direction displacement at the time of passage, and obtains a difference between a peak P1 (negative value in FIG. 10) of the vertical direction displacement and a predetermined reference value (for example, 0), as the peak value of the vertical direction displacement at the time of passage. In addition, the position acquisition unit 107 performs, for example, a waveform analysis of the width direction acceleration at the time of passage, and obtains a difference between a peak P2 (positive value in FIG. 10) of the width direction acceleration and a predetermined reference value (for example, 0), as the peak value of the width direction acceleration at the time of passage.

From this, the position acquisition unit 107 calculates a ratio of the peak value of the vertical direction displacement at the time of passage to the peak value of the width direction acceleration. The ratio of the peak values may be calculated by, for example, the following expression.

As a matter of course, the denominator and the numerator may be reversed.

The ratio of the peak values=the peak value of the width direction acceleration/the peak value of the vertical direction displacement From this, the position acquisition unit 107 determines the position of the vehicle 5 passing through the bridge 4 on the basis of the calculated ratio of the peak values and characteristic information of the bridge 4 which is stored in the storage unit 13 in advance.

Figure 11A:
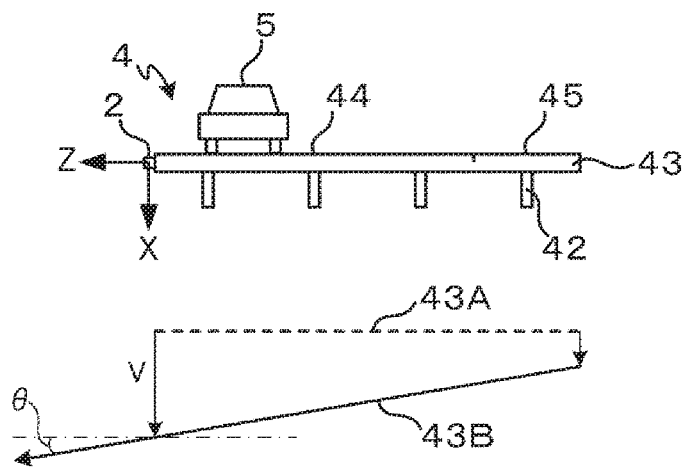
FIGS. 11A and 11B are diagrams illustrating an example of the position of a vehicle and the deformation of a floor slab.
Figure 11B:
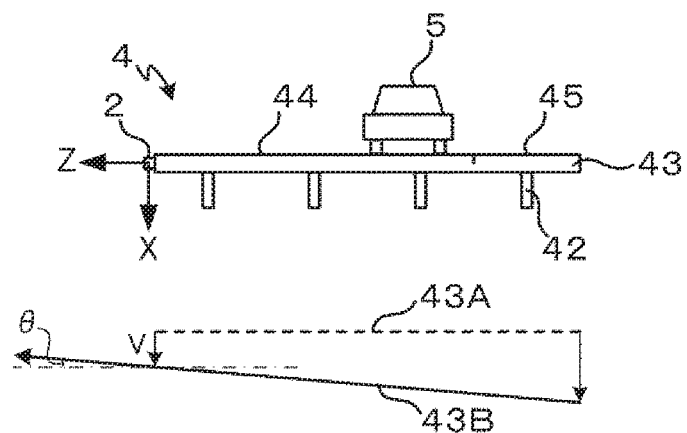

FIGS. 11A and 11B are diagrams illustrating an example of the position of the vehicle and the deformation of the floor slab. FIG. 11A shows a case where the vehicle 5 passes through a lane on the side close to the acceleration sensor 2. FIG. 11B shows a case where the vehicle 5 passes a lane on the side far from the acceleration sensor 2. In addition, in FIGS. 11A and 11B, in order to make the description thereof easier to understand, a reference state (state where any vehicle does not pass through the bridge 4 at all) 43A and a deformation state (state where the vehicle 5 passes through the floor slab 43) 43B are schematically shown with respect to the floor slab 43 having the acceleration sensor 2 installed thereon. The amount of change in the floor slab 43 in a vertical downward direction is expressed as V, and the inclination thereof to a horizontal plane is expressed as $\theta$.

As shown in FIG. 11A, in a case where the vehicle 5 has passed on a lane on the side close to the acceleration sensor 2, the floor slab 43 wholly sinks in a vertical downward direction due to the load of the vehicle 5, and inclines to the lane side on which the vehicle 5 travels. The deformation (the amount of change V) in a vertical downward direction can be measured as the vertical direction displacement on the basis of the vertical direction acceleration from the acceleration sensor 2. In addition, the deformation (inclination $\theta$) of the inclination can be measured as the width direction acceleration from the acceleration sensor 2.

As shown in FIG. 11B, in a case where the vehicle 5 has passed on a lane on the side far from the acceleration sensor 2, the floor slab 43 wholly sinks in a vertical downward direction due to the load of the vehicle 5, and inclines to the lane side on which the vehicle 5 travels. The deformation (the amount of change V) in a vertical downward direction can be measured as the vertical direction displacement on the basis of the vertical direction acceleration from the acceleration sensor 2. In addition, the deformation (inclination $\theta$) of the inclination can be measured as the width direction acceleration from the acceleration sensor 2.

In this manner, in the example of FIGS. 11A and 11B, the positive and negative of the inclination $\theta$ of the floor slab 43 are different from each other, depending on which lane the vehicle 5 passes through. In addition, the magnitude of the inclination $\theta$ of the floor slab 43 and the amount of change V also differs depending on which lane the vehicle 5 passes through.

Figure 12A:
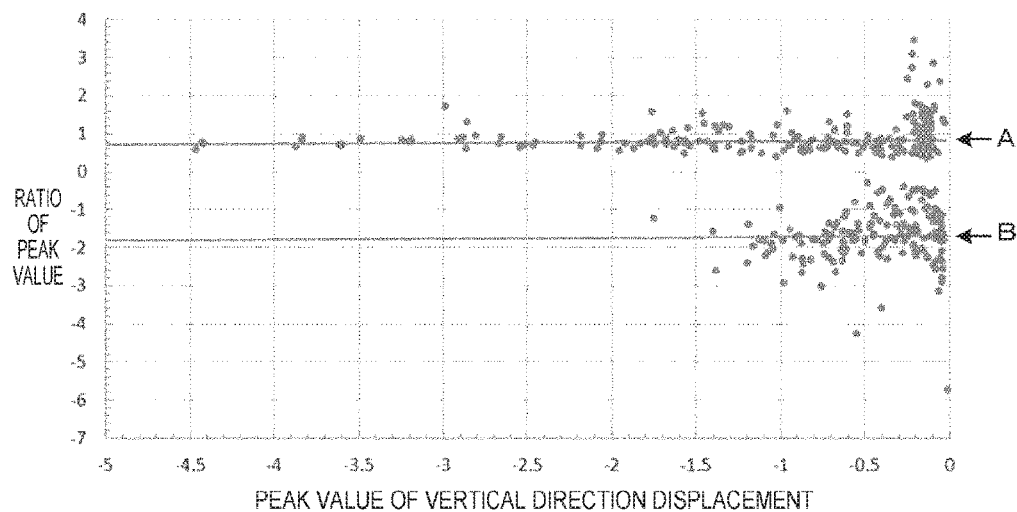
FIGS. 12A and 12B are diagrams illustrating an example of a ratio of a peak value of the vertical direction displacement to a peak value of the width direction acceleration.
Figure 12B:
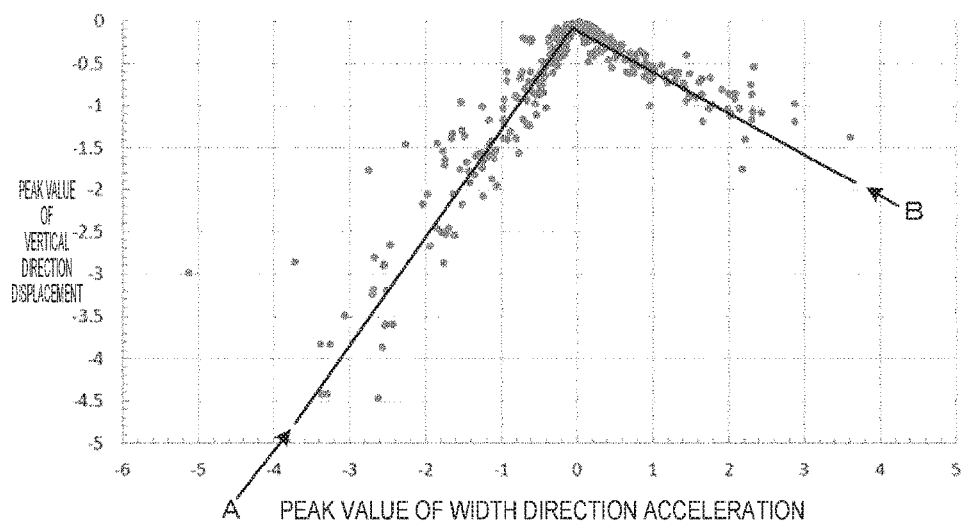

FIGS. 12A and 12B are diagrams illustrating an example of a ratio of the peak value of the vertical direction displacement to the peak value of the width direction acceleration. FIG. 12A shows a distribution of the ratio of the peak values with respect to a plurality of sample vehicles having passed through the floor slab 43. The horizontal axis represents the peak value of the vertical direction displacement, and the vertical axis represents the ratio of the peak values. FIG. 12B shows the peak value of the vertical direction displacement and the peak value of the width direction acceleration with respect to the plurality of sample vehicles having passed through the floor slab 43. The horizontal axis represents the peak value of the width direction acceleration, and the vertical axis represents the peak value of the vertical direction displacement.

As shown in FIG. 12A, in the floor slab 43, a correlation between the ratio of the peak values of each sample vehicle and the peak value of the vertical direction displacement is expressed as a distribution of different ranges, depending on passage through any of the lanes. In the examples of FIGS. 11A and 11B, in a case where the sample vehicles have passed through a lane on the side close to the acceleration sensor 2, the ratios of the peak values are distributed in a positive zone (distribution DA approximated in a function A). In addition, in a case where the sample vehicles have passed through a lane on the side far from the acceleration sensor 2, the ratios of the peak values are distributed in a negative zone (distribution DB approximated in a function B). In addition, the peak values of the vertical direction displacement are distributed in a wider range in the lane on the side close to the acceleration sensor 2 than in the lane on the far side. Since the distribution DA belongs to a positive zone, and the distribution DB belongs to a negative zone, it can be understood that the distribution DA is located at a width direction position closer to the acceleration sensor 2 than the distribution DB.

As shown in FIG. 12B, in the floor slab 43, a correlation between the peak value of the vertical direction displacement of each sample vehicle and the peak value of the width direction acceleration is expressed as a distribution of different ranges, depending on passage through any of the lanes. In addition, a correlation between the peak value of the vertical direction displacement of each sample vehicle and the peak value of the width direction acceleration can be approximated by a linear function each inclination differs depending on whether the peak values of the width direction acceleration are in a positive range or a negative range. In the examples of FIGS. 11A and 11B, in a case where the sample vehicles have passed through a lane on the side close to the acceleration sensor 2, the peak values of the width direction acceleration are distributed in a negative zone (distribution DA approximated in a function A; the inclination thereof is positive). In addition, in a case where the sample vehicles have passed through a lane on the side far from the acceleration sensor 2, the peak values of the width direction acceleration are distributed in a positive zone (distribution DB approximated in a function B; the inclination thereof is negative). In addition, the absolute value of the inclination of the function A is larger than the absolute value of the inclination of the function B. Since the distribution DA belongs to a negative zone, and the distribution DB belongs to a positive zone, it can be understood that the distribution DA is located at a width direction position closer to the acceleration sensor 2 than the distribution DB.

Meanwhile, normally, the vehicle 5 substantially passes within a regulated passage division zone (for example, lane). For this reason, a correlation between the vertical direction displacement and the width direction acceleration concentrates on a certain correlation coefficient. That is, the ratios of the vertical direction displacement and the width direction acceleration are distributed with concentration on values associated with a corresponding passage division zone. For example, two distribution centers occur in a case where there are two passage division zones, and three distribution centers occur in a case where there are three passage division zones. FIGS. 12A and 12B show a case of two lanes.

In this manner, in the floor slab 43, the ratios of the peak value of the vertical direction displacement of the sample vehicles which have passed to the peak value of the width direction acceleration are included in two different value ranges, depending on which lane the vehicles have passed through (see, particularly, FIG. 12A). Consequently, in the present embodiment, characteristic information indicating the value range of the ratios of the peak values is stored in the storage unit 13 in advance, for example, for each lane.

Therefore, in step S8, the position acquisition unit 107 refers to the characteristic information stored in the storage unit 13 to determine a value range including the ratio of the calculated peak values, and thus determines the position of the vehicle 5 (that is, whether being a lane close to the acceleration sensor 2 or a lane far therefrom) passing through the bridge 4.

Meanwhile, in the present embodiment, as described above, the positive and negative of the width direction acceleration are different from each other, depending on which lane the vehicle 5 passes through. Therefore, the characteristic information indicating the positive or negative of the width direction acceleration is stored in the storage unit 13 in advance, for example, for each lane, and the position acquisition unit 107 may determine a lane on the basis of the characteristic information stored in the storage unit 13 and the positive or negative of the calculated width direction acceleration. That is, the position acquisition unit 107 can acquire a lane through which the vehicle 5 passes, on the basis of the low-frequency range data of the calculated width direction acceleration.

In addition, in the present embodiment, as described above, the positive and negative of the width direction acceleration are different from each other, depending on which lane the vehicle 5 passes through. However, in some structures of the bridge 4, the positive and negative of the width direction acceleration may be the same as each other, depending on which lane the vehicle 5 passes through. For example, a case where the width of the roadway 44 on the floor slab 43 is wide (for example, three lanes) is considered. In this case, even when the vehicle passes through a lane on the side closest to the acceleration sensor 2, and even when the vehicle passes through a lane on the side second closest thereto, the peak value of the width direction acceleration is expressed as a negative value. However, a correlation between the ratio of the peak values of each sample vehicle and the peak value of the vertical direction displacement or a correlation between the peak value of the vertical direction displacement of the vehicle and the peak value of the width direction acceleration is expressed as a distribution (different value range or inclination) of different ranges. That is, the ratio of the peak values is included in any of the different value ranges, depending on which lane the vehicle 5 passes through. Therefore, even in this case, the characteristic information indicating the value range of the ratio of the peak values is stored in the storage unit 13 in advance, for example, for each lane, thereby allowing the position of the vehicle 5 to be acquired.

Next, the weight acquisition unit 108 acquires the weight of the vehicle 5 passing through the bridge 4, on the basis of the vertical direction displacement calculated in step S6 and the width direction acceleration (low-frequency range data) calculated in step S7 (step S9). In step S9, the weight acquisition unit 108 determines a period of time in which the signal value of the envelope exceeds a predetermined threshold in step S3, as a time of passage of the vehicle 5, and analyzes vertical direction displacement and width direction acceleration in a period of time equivalent to the time of passage.

Specifically, the weight acquisition unit 108 determines the weight of the vehicle 5 passing through the bridge 4, on the basis of the vertical direction displacement and the width direction acceleration, and the characteristic information of the bridge 4 which is stored in the storage unit 13 in advance.

Figure 13A:
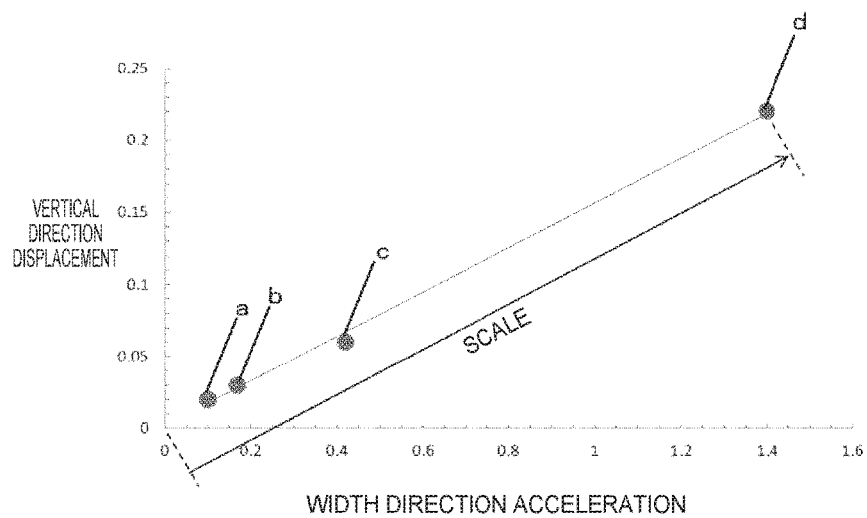
FIGS. 13A and 13B are diagrams illustrating an example of a correlation between the vertical direction displacement, the width direction acceleration, and weight.
Figure 13B:
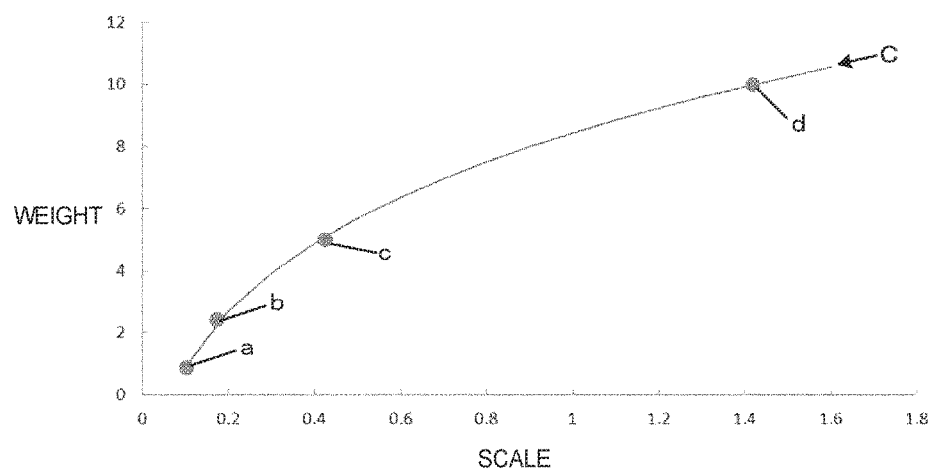

FIGS. 13A and 13B are diagrams illustrating an example of a correlation between the vertical direction displacement, the width direction acceleration, and weight. FIG. 13A shows the vertical direction displacement and the width direction acceleration with respect to a plurality of sample vehicles having passed through the floor slab 43. The horizontal axis represents the value (absolute value) of the width direction acceleration, and the vertical axis represents the value (absolute value) of the vertical direction displacement. FIG. 13B shows a conversion function of converting the vertical direction displacement and the width direction acceleration into a weight. The horizontal axis represents a predetermined scale (measure), and the vertical axis represents the weight of the vehicle. Meanwhile, FIGS. 13A and 13B are graphs relating to one lane of the floor slab 43.

As shown in FIG. 13A, in the floor slab 43, correlations between the vertical direction displacement and the width direction acceleration of respective sample vehicles (a to d) having different weights are proportional to each other, and can be approximated by a straight line from the origin (0, 0). In addition, the vertical direction displacement (absolute value) and the width direction acceleration (absolute value) increase as the weight of the sample vehicle becomes larger. Therefore, a distance in a straight line from the origin is set to a scale, and thus it is possible to create a function of a value on the scale and the weight of the vehicle.

As shown in FIG. 13B, a correlation between the value on the scale and the weight of the vehicle can be expressed in a curve by an approximation function such as a polynomial approximation. Consequently, in the present embodiment, characteristic information indicating a relationship between the scale and the weight is stored in the storage unit 13 in advance, for example, for each lane. The characteristic information can use, for example, the aforementioned conversion function.

Therefore, in step S9, the weight acquisition unit 108 calculates a distance in a straight line from the origin of the vertical direction displacement (absolute value) and the width direction acceleration (absolute value). In addition, the weight acquisition unit 108 refers to characteristic information corresponding to the lane acquired in step S8 in the characteristic information stored in the storage unit 13, and determines the weight of the vehicle 5 from the calculated distance in a straight line (value on the scale).

Meanwhile, in the present embodiment, as described above, the vertical direction displacement (absolute value) and the width direction acceleration (absolute value) increase as the weight of the sample vehicle becomes larger. Therefore, the characteristic information indicating a relationship between the vertical direction displacement (absolute value) and the weight is stored in the storage unit 13 in advance, for example, for each lane, and the weight acquisition unit 108 may determine the weight on the basis of the characteristic information and the vertical direction displacement which are stored in the storage unit 13. That is, the weight acquisition unit 108 can acquire the weight of the vehicle 5 on the basis of the vertical direction displacement. Characteristic information indicating a relationship between the width direction acceleration (absolute value) and the weight may be used instead of the characteristic information indicating a relationship between the vertical direction displacement (absolute value) and the weight.

Subsequently to step S9, the filtering unit 102 executes the process of step S1 again in the next target period of time. Meanwhile, the vehicle information acquisition unit 106 may, for example, store the time of passage of a vehicle, the position of the vehicle, the weight of the vehicle, and the like, which are acquired by the process of the flow diagram, in the storage unit 13, perform the output and display thereof on the display unit 14, or perform the output thereof through the communication unit 12.

As stated above, the first embodiment of the invention has been described. In the present embodiment, for example, the measuring device 1 acquires the position or weight of the vehicle 5 on the basis of the measurement data from one acceleration sensor 2 installed on the bridge 4. More specifically, the measuring device 1 can acquire the position (lane) of the vehicle 5 in the width direction and the weight of the vehicle 5, on the basis of the vertical direction acceleration and the width direction acceleration. Thereby, it is possible to obtain information relating to the vehicle 5 moving on the bridge 4, using a small-scale and simple system configuration.

In addition, in the present embodiment, for example, the acceleration sensor 2 is installed at the installation position 2P where a change in the position of the floor slab 43 in the vertical direction and the inclination of the floor slab 43 in the width direction are distinctly revealed. Thereby, the measuring device 1 can more accurately acquire the information relating to the vehicle 5, on the basis of the vertical direction acceleration and the width direction acceleration of the floor slab 43.

In addition, according to the present embodiment, for example, the measuring device 1 detects the passage of the vehicle 5 on the basis of the envelope of the vertical direction acceleration, and acquires the position or weight of the vehicle 5 on the basis of the measurement data in the period of time of the passage. Thereby, the measuring device 1 can more accurately acquire the information relating to the vehicle 5.

In addition, according to the present embodiment, for example, the measuring device 1 removes the frequency band including a frequency component caused by the natural vibration and resonant vibration of the bridge 4 from the vertical direction acceleration data and the width direction acceleration data, while analyzing the vertical direction acceleration and the width direction acceleration. Thereby, the measuring device 1 can more accurately acquire the information relating to the vehicle 5, on the basis of the frequency component generated by the deformation of the bridge 4 due to the load or the like of the vehicle 5 which has passed.

Second Embodiment

In the first embodiment, the characteristic information indicating a relationship between the scale and the weight is stored in the storage unit 13 in advance. In this case, since the characteristic information is not able to be corrected, it is not possible to improve the accuracy of the determination of the weight of the vehicle 5. Consequently, in second embodiment, components for calibrating the characteristic information are provided. Hereinafter, the same components as those in the first embodiment are denoted by the same reference numerals and signs, and thus the description thereof will not be given. A description will be given with a focus on different components.

Figure 14:
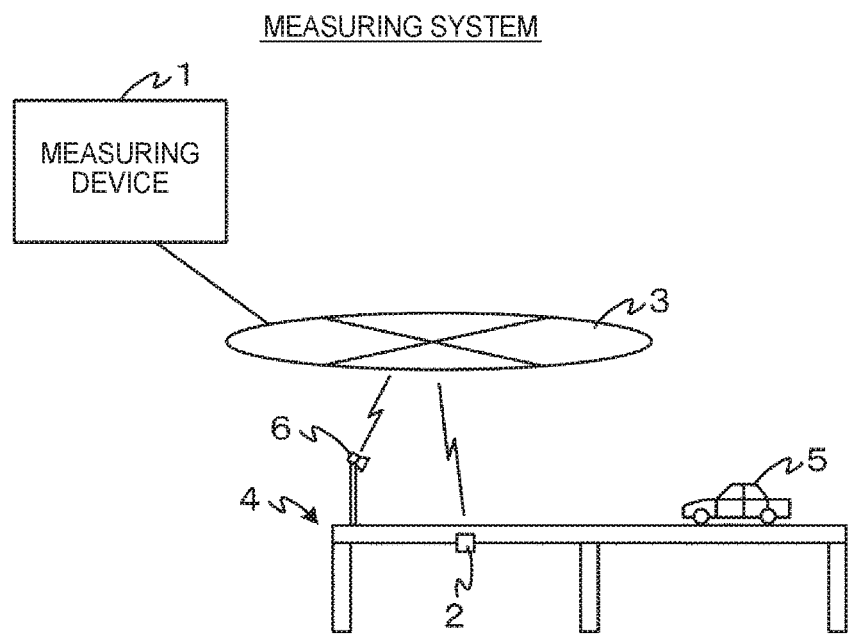
FIG. 14 is a diagram illustrating an example of a schematic configuration of a measuring system according to a second embodiment of the invention.

FIG. 14 is a diagram illustrating an example of a schematic configuration of a measuring system according to a second embodiment of the invention.

The measuring system includes a camera 6. The measuring device 1 and the camera 6 are communicably connected to each other through the communication network 3. The camera 6 is installed, for example, so that the vehicle 5 passing through the roadway 44 on the floor slab 43 having the acceleration sensor 2 installed thereon falls within an imaging range. The camera 6 captures an image including the vehicle 5, and transmits image data to the measuring device 1.

Figure 15:
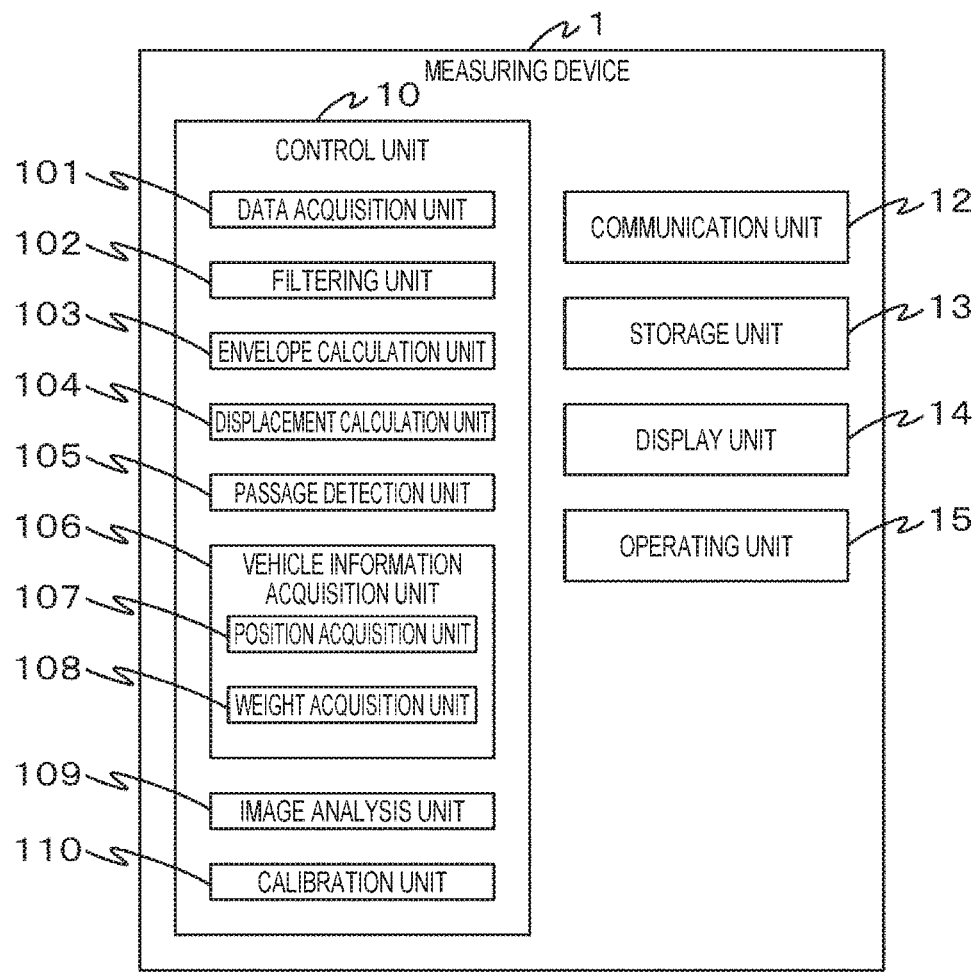
FIG. 15 is a block diagram illustrating an example of a functional configuration of a measuring device.

FIG. 15 is a block diagram illustrating an example of a functional configuration of the measuring device.

The control unit 10 includes an image analysis unit 109 and a calibration unit 110.

The image analysis unit 109 analyzes the image data, and recognizes the vehicle 5 passing through the floor slab 43 having the acceleration sensor 2 installed thereon through an image recognition process. Meanwhile, as for the image recognition process, existing techniques such as motion detection, feature point extraction, and pattern matching, may be used, and thus the description thereof will not be given. In addition, the image analysis unit 109 acquires the weight of the recognized vehicle 5. The process of the image analysis unit 109 will be described later in detail.

The calibration unit 110 calibrates the characteristic information indicating a relationship between the scale and the weight, on the basis of the vertical direction displacement and the width direction acceleration when the recognized vehicle 5 has passed, and the acquired weight of the vehicle 5. The process of the calibration unit 110 will be described later in detail.

Meanwhile, the data acquisition unit 101 acquires the image data transmitted from the camera 6 through the communication unit 12. In addition, the passage detection unit 105 detects the passage of the vehicle 5 in the bridge 4, on the basis of the envelope of the calculated vertical direction acceleration and the recognition result of the vehicle 5 performed by the image analysis unit 109. The process of the passage detection unit 105 will be described later in detail.

Figure 16:
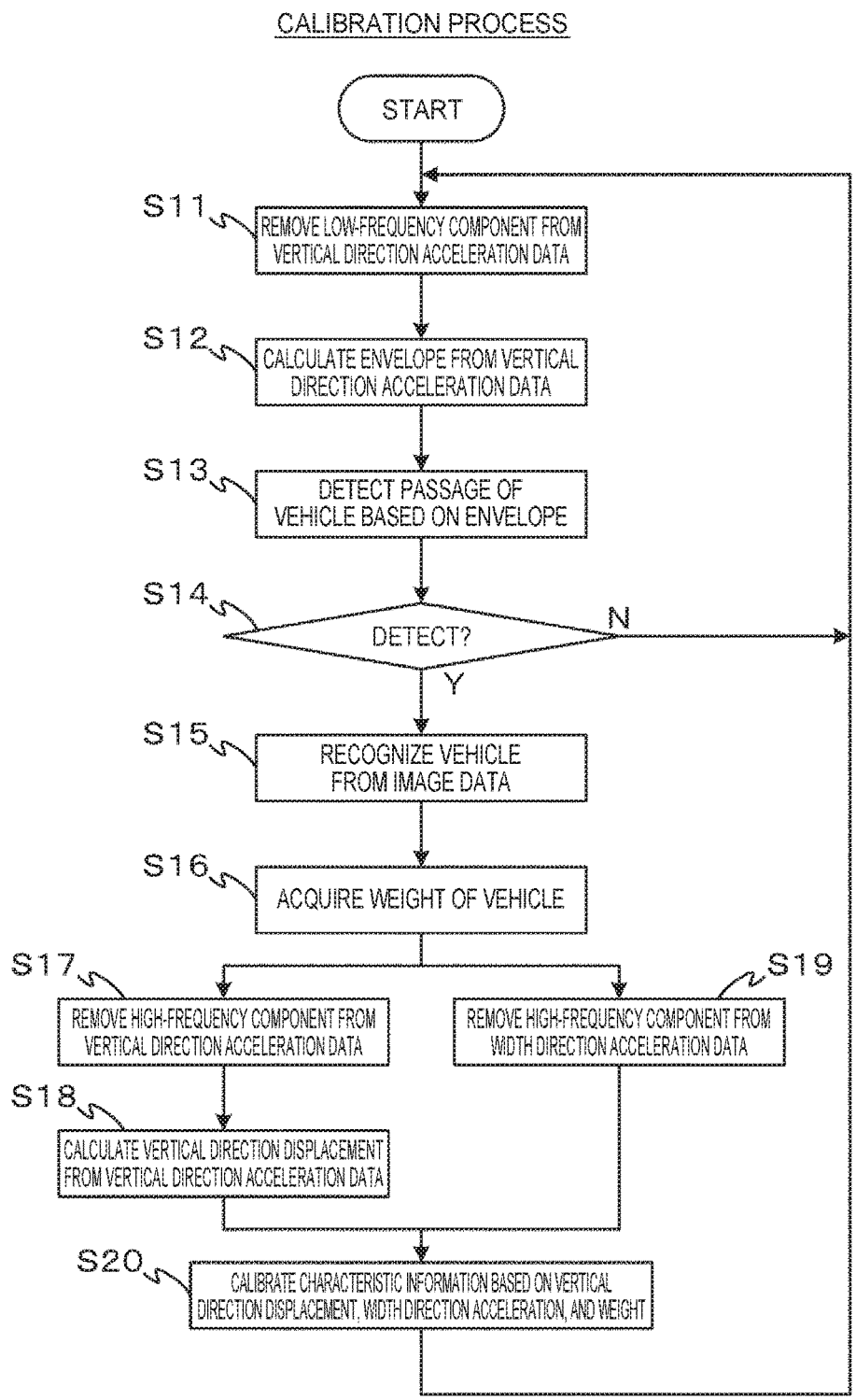
FIG. 16 is a flow diagram illustrating an example of a calibration process which is executed by the measuring device.

FIG. 16 is a flow diagram illustrating an example of a calibration process which is executed by the measuring device. Meanwhile, the data acquisition unit 101 receives, for example, the measurement data (vertical direction acceleration data and width direction acceleration data) from the acceleration sensor 2, receives the image data from the camera 6, and accumulates the measurement data and the image data in the storage unit 13 so as to be capable of analyzing these data in a time-series manner.

The processes of steps S11 to S14 are the same as those of steps S1 to S4 (FIG. 5), or the results of step S1 to S4 may be used, and thus the description thereof will not be given.

In a case where the passage of the vehicle 5 is detected (Y in step S14), the image analysis unit 109 recognizes the vehicle 5 from the image data (step S15). In step S15, the image analysis unit 109 determines a period of time in which the signal value of the envelope exceeds a predetermined threshold in step S13, as a time of passage of the vehicle 5, and analyzes image data in a period of time equivalent to the time of passage.

For example, the image analysis unit 109 performs the image recognition process on the image data in the time of passage, and thus recognizes the vehicle 5 passing through the floor slab 43 having the acceleration sensor 2 installed thereon. In the present embodiment, a vehicle database with which feature information, a weight and the like used in pattern matching are associated is stored in the storage unit 13 in advance, for example, for each type (for example, maker or model) of vehicle 5. Therefore, in step S15, the image analysis unit 109 refers to the vehicle database, and thus can determine the type of vehicle 5 together with the recognition of the vehicle 5.

In addition, the image analysis unit 109 acquires the weight of the vehicle 5 recognized in step S15 (step S16). For example, similarly to step S15, the image analysis unit 109 refers to the vehicle database, and thus can acquire the weight of the recognized vehicle 5.

The processes of steps S17 to S19 are the same as those of steps S5 to S7 (FIG. 5), or the results of step S5 to S7 may be used, and thus the description thereof will not be given.

Subsequently to step S18 and step S19, the calibration unit 110 calibrates the characteristic information indicating a relationship between the scale and the weight, on the basis of the vertical direction displacement calculated in step S18, the width direction acceleration (low-frequency range data) calculated in step S19, and the weight of the vehicle 5 acquired in step S16 (step S20).

As described in FIGS. 13A and 13B, a correlation between the value on the scale corresponding to the vertical direction displacement and the width direction acceleration of the vehicle and the weight of the vehicle can be expressed in a curve by an approximation function such as a polynomial approximation. It can be considered that this correlation changes depending on various factors such as, for example, the weather, the temperature of the bridge 4, and the degradation over time of the bridge 4.

Consequently, the calibration unit 110 calculates a distance in a straight line (value on the scale) from the origin (0, 0) of the vertical direction displacement calculated in step S18 and the width direction acceleration calculated in step S19. In addition, the calibration unit 110 stores the calculated value on the scale and the weight acquired in step S16 in the storage unit 13 in association with each other. In addition, the calibration unit 110 performs an approximation such as a polynomial approximation, for example, using a least squares method, on the basis of the value on the scale and the weight relating to the vehicle 5 detected in step S14 at this time and the value on the scale and the weight relating to one or more vehicles 5 detected in step S14 in the past, and obtains a conversion function indicating a correlation between the value on the scale and the weight. In addition, the calibration unit 110 renews a conversion function stored in the storage unit 13 using the obtained conversion function.

Meanwhile, a coefficient of the conversion function rather than the conversion function is stored in the storage unit 13. In step S20, the calibration unit 110 may renew a coefficient stored in the storage unit 13 using the coefficient of the obtained conversion function.

Subsequently to step S20, the filtering unit 102 executes the process of step S11 again in the next target period of time.

As stated above, the second embodiment of the invention has been described. In the present embodiment, for example, the measuring device 1 recognizes an image of a sample vehicle from the captured image data, and calibrates the characteristic information indicating a relationship between the scale and the weight, on the basis of the vertical direction displacement and the width direction acceleration when the sample vehicle has passed and the weight of the sample vehicle. Thereby, it is possible to improve the determination accuracy for the weight of the vehicle 5 by simply calibrating the characteristic information.

The invention is not limited to each of the embodiments, and can be variously modified without departing from the scope of the invention. In addition, each embodiment and each modification example can also be appropriately combined.

In the first embodiment, the passage detection unit 105 detects the passage of the vehicle 5 on the basis of the envelope of the vertical direction acceleration (high-frequency range data), but a detection method is not limited thereto. For example, a camera is installed so that the vehicle 5 passing through the roadway 44 on the floor slab 43 falls within an imaging range, and the passage detection unit 105 may detect the passage of the vehicle by performing an image analysis on the basis of the image data from the camera. In the second embodiment, the passage detection unit 105 may also detect the passage of the vehicle on the basis of the image data from the camera. In addition, in each embodiment, for example, a sensor such as a weight sensor is installed on the floor slab 43, and the passage detection unit 105 may detect the passage of the vehicle on the basis of a signal from the sensor.

In the second embodiment, an image of a sample vehicle is recognized from the captured image data, and the weight of the sample vehicle is acquired, but image recognition may not be performed. That is, a preset type of sample vehicle is caused to pass on the floor slab 43, and the calibration unit 110 may acquire a weight corresponding to the sample vehicle from the vehicle database. Meanwhile, the sample vehicle is caused to pass on the floor slab 43, for example, at a timing planned in advance, and the calibration unit 110 may perform calibration at this timing. In addition, one or more sample vehicles may be caused to pass, and one or more types of sample vehicles may be caused to pass. With such a configuration, it is possible to calibrate the characteristic information without providing the camera 6 or the image analysis unit 109.

In each of the embodiments, a case of two lanes exemplified, but the number of lanes may be one, and may be three or more. That is, in a state where the characteristic information indicating the value range of ratio of the peak values is stored in the storage unit 13 in advance for each lane, the position acquisition unit 107 may refer to the characteristic information stored in the storage unit 13 and determine the value range including the calculated ratio of the peak values, to thereby determine a lane through which the vehicle 5 passes. In addition, in a state where the characteristic information indicating a relationship between the scale and the weight is stored in the storage unit 13 in advance for each lane, the weight acquisition unit 108 may refer to characteristic information corresponding to the lane acquired by the position acquisition unit 107, and determine the weight of the vehicle 5 from the calculated distance in a straight line (value on the scale).

In each of the embodiments, the characteristic information is stored for each lane, and the position (lane) of the vehicle 5 is determined, but the unit of determination is not limited to the lane. That is, in a state where the characteristic information is stored for each position (for example, position of a predetermined width interval) in the width direction, the position acquisition unit 107 may acquire the position (position in the width direction) of the vehicle 5. In this case, in a state where the characteristic information indicating a relationship between the scale and the weight is stored in advance for each position in the width direction, the weight acquisition unit 108 may refer to characteristic information corresponding to the position (position in the width direction) acquired by the position acquisition unit 107, and determine the weight of the vehicle 5 from the calculated distance in a straight line (value on the scale). With such a configuration, it is possible to acquire the position in the width direction in more detail.

In each of the embodiments, the weight of the vehicle 5 is acquired, but there is no limitation thereto. For example, in a state where the value range of weights according to the rank of a bike, a passenger car, a truck and the like is stored in the storage unit 13 in advance, the weight acquisition unit 108 may acquire a rank corresponding to the acquired weight of the vehicle 5.

In addition, the vehicle information acquisition unit 106 may output the acquired rank of the vehicle 5. With such a configuration, a user can simply recognize the type of vehicle 5 which has passed.

In each of the embodiments, the vertical direction and the width direction of the road surface S are not required to accurately coincident with the plumb direction and the horizontal direction. In addition, in each of the embodiments, an error or the like of the installation posture of the acceleration sensor 2 is allowed. Meanwhile, in a case where there are errors of the postures of two detection axes of the acceleration sensor 2 in the vertical direction and the width direction of the bridge 4, a correction arithmetic operation or the like may be performed in which the detection axis coordinate system of the acceleration sensor 2 is converted into the vertical direction and the width direction installation location.

In each of the embodiments, at least one of the position acquisition unit 107, the weight acquisition unit 108, and the calibration unit 110 may be configured to use the traveling direction (regulation direction) acceleration of the vehicle 5 of the floor slab 43, instead of the width direction acceleration of the floor slab 43, or in addition to width direction acceleration.

This is because, similarly to the width direction acceleration, the traveling direction acceleration also has change characteristics differing depending on the position of the vehicle 5 on the floor slab 43 or the type of vehicle 5.

In each of the embodiments, the measuring device 1 and the acceleration sensor 2 may be configured as a device received in one housing. This device is installed on the bridge 4. The measuring device 1 of this device may transmit various data such as the measurement data and the information relating to the vehicle 5 to the communication network 3.

Meanwhile, the components of the measuring device 1 shown in FIGS. 4 and 15 are classified in accordance with main processing contents in order to make the components of the measuring device 1 easier to understand. The invention is not restricted by a way to classify the components or the names thereof. The components of the measuring device 1 can also be classified into more components in accordance with processing contents. In addition, one component can also be classified so as to execute more processes. In addition, the process of each component may be executed by one piece of hardware, and may be executed by a plurality of pieces of hardware. In addition, insofar as the object and effect of the invention can be achieved, the division of the process or function of each component is not limited to those described above.

In addition, the units of processing of the flow diagrams shown in FIGS. 5 and 16 are divided in accordance with main processing contents in order to make the process of the measuring device 1 easier to understand. The invention is not restricted by a way to divide the units of processing or the names thereof. The process of the measuring device 1 can also be divided into more units of processing in accordance with processing contents. In addition, one unit of processing can also be divided so as to include more processes. Further, insofar as the object and effect of the invention can be achieved, the procedure of processes of the above flow diagrams is not limited to the shown examples.

Meanwhile, the invention can be applied to a structure in which the displacement of a road surface in a vertical direction and the inclination thereof in a width direction occur due to the passage of a vehicle. In addition, the invention can be applied to a moving object moving on a structure without being limited to a vehicle.

The entire disclosures of Japanese Patent Application No. 2015-196617, filed Oct. 2, 2015 and No. 2015-196615, filed Oct. 2, 2015 are expressly incorporated by reference herein.

What is claimed is:

1. A movable object information obtaining system comprising:
    an acceleration sensor that is disposed on a side of a bridge deck, the bridge deck extending along a plane having a Y axis and a Z axis perpendicular to each other, a movable object being movable on the bridge deck in a direction along the Y axis, the bridge deck being movable along an X axis perpendicular to the Y and Z axes when the movable object moves on the bridge deck, the acceleration sensor being configured to detect vertical direction acceleration along the X axis and to detect width direction acceleration along the Z axis;
    a memory configured to store computer-readable instructions; and
    a processor configured to execute the computer-readable instructions so as to:
        obtain sensor data corresponding to the vertical direction acceleration and the width direction acceleration from the acceleration sensor;
        filter out a frequency band including a natural resonance frequency component of the bridge from the sensor data so as to generate filtered sensor data;
        calculate vertical direction displacement based on the vertical direction acceleration detected by the acceleration sensor; and
        obtain movable object information of the movable object based on the filtered data and the vertical direction displacement,
    wherein the sensor is configured to detect a Z axis component of gravity acceleration due to inclination of a surface of the bridge deck when the movable object moves on the bridge deck, and the Z axis component corresponds to the width direction acceleration, and
    the sensor is configured to detect the vertical direction acceleration along the X axis due to the inclination of the surface of the bridge deck caused by a weight of the movable object.

2. The movable object information obtaining system according to claim 1,
    wherein the processor is configured to determine a position of the movable object on the bridge deck with respect to the Z axis based on the movable object information, and
    the movable object information includes a waveform of the width direction acceleration.

3. The movable object information obtaining system according to claim 1,
    wherein the processor is configured to determine a position of the movable object on the bridge deck with respect to the Z axis based on the movable object information, and
    the movable object information includes a ratio of a peak value of a waveform of the vertical direction displacement to a peak value of a waveform of the width direction acceleration.

4. The movable object information obtaining system according to claim 3,
    wherein the memory is configured to store a correlation among a plurality of sample movable object weights, a plurality of sample movable object vertical direction displacement values, and a plurality of sample movable object width direction acceleration values of a plurality of sample movable objects that are obtained in advance when a plurality of sample movable objects move on the bridge deck, and
    the processor is configured to calculate the weight of the movable object based on the correlation.

5. The movable object information obtaining system according to claim 4,
    wherein the processor is configured to cause a camera to capture a movable object image of the movable object when the movable object moves on the bridge deck,
    the processor is configured to compare between the movable object image and images of the plurality of sample movable object stored in the memory so as to have a comparison result so that the processor is configured to determine the weight of the movable object, and
    the processor is configured to calibrate the correlation based on the comparison result.

6. The movable object information obtaining system according to claim 1,
    wherein the processor is configured to calculate an envelope of a waveform of the vertical direction acceleration,
    the processor is configured to detect whether a value of the envelope exceeds a threshold, and the processor is configured to detect a movement of the movable object when the processor detects that the value of the envelope exceeds the threshold, and
    the processor is configured to obtain the movable object information of the movable object based on the detected movement.

7. The movable object information obtaining system according to claim 2,
    wherein the processor is configured to calculate an envelope of a waveform of the vertical direction acceleration,
    the processor is configured to detect whether a value of the envelope exceeds a threshold, and the processor is configured to detect a movement of the movable object when the processor detects that the value of the envelope exceeds the threshold, and
    the processor is configured to obtain the movable object information of the movable object based on the detected movement.

8. The movable object information obtaining system according to claim 3,
    wherein the processor is configured to calculate an envelope of a waveform of the vertical direction acceleration,
    the processor is configured to detect whether a value of the envelope exceeds a threshold, and the processor is configured to detect a movement of the movable object when the processor detects that the value of the envelope exceeds the threshold, and
    the processor is configured to obtain the movable object information of the movable object based on the detected movement.

9. The movable object information obtaining system according to claim 4,
wherein the processor is configured to calculate an envelope of a waveform of the vertical direction acceleration,
the processor is configured to detect whether a value of the envelope exceeds a threshold, and the processor is configured to detect a movement of the movable object when the processor detects that the value of the envelope exceeds the threshold, and the processor is configured to obtain the movable object information of the movable object based on the detected movement.

10. The movable object information obtaining system according to claim 5,
wherein the processor is configured to calculate an envelope of a waveform of the vertical direction acceleration,
the processor is configured to detect whether a value of the envelope exceeds a threshold, and the processor is configured to detect a movement of the movable object when the processor detects that the value of the envelope exceeds the threshold, and the processor is configured to obtain the movable object information of the movable object based on the detected movement.

11. A method of obtaining movable object information for causing a processor to execute computer-readable instructions stored in a memory, the method comprising executing on the processor the steps of:
detecting vertical direction acceleration along an X axis by an acceleration sensor that is disposed on a side of a bridge deck, the bridge deck extending along a plane having a Y axis and a Z axis perpendicular to each other, a movable object being movable on the bridge deck in a direction along the Y axis, the bridge deck being movable along the X axis perpendicular to the Y and Z axes when the movable object moves on the bridge deck;
detecting width direction acceleration along the Z axis by the acceleration sensor;
obtaining sensor data corresponding to the vertical direction acceleration and the width direction acceleration from the acceleration sensor;
filtering out a frequency band including a natural resonance frequency component of the bridge from the sensor data so as to generate filtered sensor data;
calculating vertical direction displacement based on the vertical direction acceleration detected by the acceleration sensor; and
obtaining movable object information of the movable object based on the filtered data and the vertical direction displacement, the obtaining the movable object information including further steps of:
determining a position of the movable object on the bridge deck with respect to the Z axis based on the movable object information, and the movable object information includes a ratio of a peak value of a waveform of the vertical direction displacement to a peak value of a waveform of the width direction acceleration;
storing a correlation in the memory, the correlation being among a plurality of sample movable object weights, a plurality of sample movable object vertical direction displacement values, and a plurality of sample movable object width direction acceleration values of a plurality of sample movable objects that are obtained in advance when the plurality of sample movable objects move on the bridge deck; and
calculating the weight of the movable object based on the correlation,
wherein the sensor is configured to detect a Z axis component of gravity acceleration due to inclination of a surface of the bridge deck when the movable object moves on the bridge deck, and the Z axis component corresponds to the width direction acceleration, and
the sensor is configured to detect the vertical direction acceleration along the X axis due to the inclination of the surface of the bridge deck caused by the weight of the movable object.

12. The method of claim 11, further comprising executing on the processor the steps of:
calculating an envelope of a waveform of the vertical direction acceleration;
detecting whether a value of the envelope exceeds a threshold;
detecting a movement of the movable object when the value of the envelope exceeds the threshold; and
obtaining the movable object information of the movable object based on the detected movement.

* * * * *